US009922347B1

(12) United States Patent
Burcham et al.

(10) Patent No.: US 9,922,347 B1
(45) Date of Patent: Mar. 20, 2018

(54) AD MANAGEMENT USING ADS CACHED ON A MOBILE ELECTRONIC DEVICE

(71) Applicant: Sprint Communications Company L.P., Overland Park, KS (US)

(72) Inventors: Robert H. Burcham, Overland Park, KS (US); Jason R Delker, Olathe, KS (US); Geoffrey A. Holmes, Olathe, KS (US); M. Jeffrey Stone, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 465 days.

(21) Appl. No.: 14/165,571

(22) Filed: Jan. 27, 2014

Related U.S. Application Data

(60) Provisional application No. 61/910,001, filed on Nov. 27, 2013, provisional application No. 61/910,002, filed on Nov. 27, 2013.

(51) Int. Cl.
  *G06Q 30/00* (2012.01)
  *G06Q 30/02* (2012.01)
(52) U.S. Cl.
  CPC ..... *G06Q 30/0267* (2013.01); *G06Q 30/0269* (2013.01)
(58) Field of Classification Search
  CPC ........... G06Q 30/0277; G06Q 30/0251; G06Q 30/0241; G06Q 30/0272
  USPC .......................................................... 705/14
  See application file for complete search history.

(56) References Cited

U.S. PATENT DOCUMENTS

| 5,636,346 | A | 6/1997 | Saxe |
| 5,761,648 | A | 6/1998 | Golden et al. |
| 5,848,396 | A | 12/1998 | Gerace |
| 5,848,397 | A | 12/1998 | Marsh et al. |
| 5,918,014 | A | 6/1999 | Robinson |
| 5,918,041 | A | 6/1999 | Berstis |
| 5,933,811 | A | 8/1999 | Angles et al. |
| 5,937,392 | A | 8/1999 | Alberts |
| 5,974,398 | A | 10/1999 | Hanson et al. |
| 6,202,023 | B1 | 3/2001 | Hancock et al. |
| 6,233,566 | B1 | 5/2001 | Levine et al. |
| 6,266,649 | B1 | 7/2001 | Linden et al. |
| 6,286,005 | B1 | 9/2001 | Cannon |

(Continued)

FOREIGN PATENT DOCUMENTS

| WO | WO03044703 A1 | 5/2003 |
| WO | WO2012093396 A1 | 7/2012 |
| WO | WO2015038562 A1 | 3/2015 |

OTHER PUBLICATIONS

Examiner's Answer dated Nov. 8, 2010, U.S. Appl. No. 11/491,387, filed Jul. 21, 2006.

(Continued)

*Primary Examiner* — Bennett M Sigmond
*Assistant Examiner* — Scott C Anderson

(57) ABSTRACT

A method of displaying an ad on a swipe screen of a mobile device comprises: receiving, at the mobile device, a plurality of ads, storing the plurality of ads in an ad cache in a memory of the mobile device, select an ad from the plurality of ads stored in the ad cache, receiving an input on the mobile device when the mobile device is in a sleep mode, presenting a swipe screen on the mobile device based on the input, and displaying, by the swipe screen application, the ad on the swipe screen on the mobile device.

20 Claims, 9 Drawing Sheets

(56) References Cited

U.S. PATENT DOCUMENTS

| | | |
|---|---|---|
| 6,317,722 B1 | 11/2001 | Jacobi et al. |
| 6,321,983 B1 | 11/2001 | Katayanagi et al. |
| 6,332,127 B1 | 12/2001 | Bandera et al. |
| 6,826,575 B1 | 11/2004 | Waclawski |
| 6,834,266 B2 | 12/2004 | Kumar et al. |
| 6,839,680 B1 | 1/2005 | Liu et al. |
| 6,853,982 B2 | 2/2005 | Smith et al. |
| 6,910,017 B1 | 6/2005 | Woo et al. |
| 6,963,867 B2 | 11/2005 | Ford et al. |
| 6,966,536 B2 | 11/2005 | Enomoto et al. |
| 6,990,462 B1 | 1/2006 | Wilcox et al. |
| 7,022,905 B1 | 4/2006 | Hinman et al. |
| 7,065,532 B2 | 6/2006 | Elder et al. |
| 7,096,194 B2 | 8/2006 | Johnson |
| 7,127,313 B2 | 10/2006 | Neri |
| 7,143,143 B1 | 11/2006 | Thompson |
| 7,251,615 B2 | 7/2007 | Woo |
| 7,284,033 B2 | 10/2007 | Jhanji |
| 7,353,267 B1 | 4/2008 | Cunningham et al. |
| 7,406,436 B1 | 7/2008 | Reisman |
| 7,437,308 B2 | 10/2008 | Kumar et al. |
| 7,481,367 B2 | 1/2009 | Fees et al. |
| 7,647,258 B2 | 1/2010 | William et al. |
| 7,676,394 B2 | 3/2010 | Ramer et al. |
| 7,680,899 B1 | 3/2010 | Barnes et al. |
| 7,698,335 B1 | 4/2010 | Vronay |
| 7,788,644 B2 | 8/2010 | Koduru et al. |
| 7,801,518 B1 | 9/2010 | Urbanek |
| 7,840,498 B2 | 11/2010 | Frank et al. |
| 7,958,005 B2 | 6/2011 | Dangaltchev |
| 7,974,616 B1 | 7/2011 | Urbanek |
| 8,214,454 B1 | 7/2012 | Barnes et al. |
| 8,326,673 B1 | 12/2012 | Biere et al. |
| 8,355,955 B1 | 1/2013 | Mirchandani et al. |
| 8,423,408 B1 | 4/2013 | Barnes et al. |
| 8,442,858 B1 | 5/2013 | Barnes et al. |
| 9,248,340 B2 | 2/2016 | Hoffman et al. |
| 9,275,390 B1 | 3/2016 | Barnes et al. |
| 9,319,379 B1 | 4/2016 | Burcham et al. |
| 9,374,335 B2 | 6/2016 | Burnham et al. |
| 2001/0039500 A1 | 11/2001 | Johnson |
| 2001/0044743 A1 | 11/2001 | McKinley et al. |
| 2001/0047294 A1 | 11/2001 | Rothschild |
| 2002/0010627 A1 | 1/2002 | Lerat |
| 2002/0013727 A1 | 1/2002 | Lee |
| 2002/0026355 A1 | 2/2002 | Mitsuoka et al. |
| 2002/0026361 A1 | 2/2002 | Blom |
| 2002/0030100 A1 | 3/2002 | Katayanagi et al. |
| 2002/0032771 A1 | 3/2002 | Gledje |
| 2002/0035474 A1 | 3/2002 | Alpdemir |
| 2002/0059387 A1 | 5/2002 | Wolfe |
| 2002/0060246 A1 | 5/2002 | Gobburu et al. |
| 2002/0065713 A1 | 5/2002 | Awada et al. |
| 2002/0091569 A1 | 7/2002 | Kitaura et al. |
| 2002/0091571 A1 | 7/2002 | Thomas et al. |
| 2002/0095333 A1 | 7/2002 | Jokinen et al. |
| 2002/0107027 A1 | 8/2002 | O'Neil |
| 2002/0128904 A1 | 9/2002 | Carruthers et al. |
| 2002/0128908 A1 | 9/2002 | Levin et al. |
| 2002/0143630 A1 | 10/2002 | Steinman et al. |
| 2002/0152133 A1 | 10/2002 | King et al. |
| 2002/0165849 A1 | 11/2002 | Singh et al. |
| 2002/0184080 A1 | 12/2002 | Murad et al. |
| 2003/0004802 A1 | 1/2003 | Callegari |
| 2003/0004808 A1 | 1/2003 | Elhaoussine et al. |
| 2003/0007643 A1 | 1/2003 | Ben-Zur et al. |
| 2003/0018516 A1 | 1/2003 | Ayala et al. |
| 2003/0018558 A1 | 1/2003 | Heffner et al. |
| 2003/0023482 A1* | 1/2003 | Messner ............. G06Q 20/204 705/14.26 |
| 2003/0028451 A1 | 2/2003 | Ananian |
| 2003/0032409 A1 | 2/2003 | Hutcheson et al. |
| 2003/0050863 A1 | 3/2003 | Radwin |
| 2003/0074251 A1 | 4/2003 | Kumar |
| 2003/0074259 A1 | 4/2003 | Slyman, Jr. et al. |
| 2003/0101024 A1 | 5/2003 | Adar et al. |
| 2003/0101449 A1 | 5/2003 | Bentolila et al. |
| 2003/0126250 A1 | 7/2003 | Jhanji |
| 2003/0171962 A1 | 9/2003 | Hirth et al. |
| 2003/0172007 A1 | 9/2003 | Helmolt et al. |
| 2003/0229502 A1 | 12/2003 | Woo |
| 2004/0019540 A1 | 1/2004 | William et al. |
| 2004/0019541 A1 | 1/2004 | William et al. |
| 2004/0111315 A1 | 6/2004 | Sharma et al. |
| 2004/0148628 A1 | 7/2004 | Mears |
| 2004/0194052 A1 | 9/2004 | Hoffschulz et al. |
| 2005/0021403 A1 | 1/2005 | Ozer et al. |
| 2005/0028188 A1 | 2/2005 | Latona et al. |
| 2005/0078660 A1 | 4/2005 | Wood |
| 2005/0101332 A1 | 5/2005 | Kotzin |
| 2005/0102272 A1 | 5/2005 | Kumar et al. |
| 2005/0114829 A1 | 5/2005 | Robin et al. |
| 2005/0177419 A1 | 8/2005 | Choi et al. |
| 2005/0193036 A1 | 9/2005 | Phillips et al. |
| 2005/0194431 A1 | 9/2005 | Fees et al. |
| 2005/0197887 A1 | 9/2005 | Zuerl et al. |
| 2005/0197918 A1 | 9/2005 | Wittmer et al. |
| 2005/0215238 A1 | 9/2005 | Macaluso |
| 2005/0228754 A1 | 10/2005 | Pezzaniti et al. |
| 2005/0245246 A1 | 11/2005 | Munch et al. |
| 2005/0246394 A1 | 11/2005 | Neri |
| 2005/0256759 A1 | 11/2005 | Acharya et al. |
| 2005/0278296 A1 | 12/2005 | Bostwick |
| 2006/0020513 A1 | 1/2006 | Nagano et al. |
| 2006/0074769 A1 | 4/2006 | Looney et al. |
| 2006/0080135 A1 | 4/2006 | Frank et al. |
| 2006/0080171 A1 | 4/2006 | Jardins et al. |
| 2006/0085253 A1 | 4/2006 | Mengerink et al. |
| 2006/0085517 A1 | 4/2006 | Kaurila |
| 2006/0141428 A1 | 6/2006 | Herrod et al. |
| 2006/0178932 A1 | 8/2006 | Lang |
| 2006/0212350 A1 | 9/2006 | Ellis et al. |
| 2006/0223495 A1 | 10/2006 | Cassett et al. |
| 2006/0224437 A1 | 10/2006 | Gupta et al. |
| 2007/0005647 A1 | 1/2007 | Cugi et al. |
| 2007/0022009 A1 | 1/2007 | Cataldi et al. |
| 2007/0026871 A1 | 2/2007 | Wager |
| 2007/0060099 A1 | 3/2007 | Ramer et al. |
| 2007/0061229 A1 | 3/2007 | Ramer et al. |
| 2007/0094042 A1 | 4/2007 | Ramer et al. |
| 2007/0100963 A1 | 5/2007 | Ban et al. |
| 2007/0106520 A1 | 5/2007 | Akkiraju et al. |
| 2007/0130005 A1 | 6/2007 | Jaschke |
| 2007/0192715 A1 | 8/2007 | Kataria et al. |
| 2007/0198339 A1 | 8/2007 | Shen et al. |
| 2007/0208619 A1 | 9/2007 | Branam et al. |
| 2007/0239518 A1 | 10/2007 | Chung et al. |
| 2007/0244750 A1* | 10/2007 | Grannan ............. G06Q 30/02 705/14.64 |
| 2008/0004884 A1 | 1/2008 | Flake et al. |
| 2008/0010137 A1 | 1/2008 | Ho et al. |
| 2008/0040175 A1 | 2/2008 | Dellovo |
| 2008/0065476 A1 | 3/2008 | Klein et al. |
| 2008/0082412 A1 | 4/2008 | Tallyn et al. |
| 2008/0097851 A1 | 4/2008 | Bemmel et al. |
| 2008/0104637 A1 | 5/2008 | Rodriguez et al. |
| 2008/0120565 A1 | 5/2008 | Stiso et al. |
| 2008/0126515 A1 | 5/2008 | Chambers et al. |
| 2008/0140476 A1 | 6/2008 | Arland et al. |
| 2008/0147478 A1 | 6/2008 | Mall et al. |
| 2008/0228583 A1 | 9/2008 | MacDonald et al. |
| 2009/0029721 A1 | 1/2009 | Doraswamy |
| 2009/0048977 A1 | 2/2009 | Aggarwal et al. |
| 2009/0070129 A1 | 3/2009 | Inbar et al. |
| 2009/0076899 A1 | 3/2009 | Gbodimowo |
| 2009/0150215 A1 | 6/2009 | Kalb et al. |
| 2009/0157512 A1 | 6/2009 | King |
| 2009/0198580 A1 | 8/2009 | Broberg et al. |
| 2009/0222329 A1 | 9/2009 | Ramer et al. |
| 2009/0234912 A1 | 9/2009 | Perrine et al. |
| 2009/0256858 A1 | 10/2009 | Ogikubo et al. |
| 2009/0265245 A1 | 10/2009 | Wright |
| 2009/0271255 A1 | 10/2009 | Utter et al. |
| 2009/0292608 A1 | 11/2009 | Polachek |

(56) References Cited

U.S. PATENT DOCUMENTS

| | | | |
|---|---|---|---|
| 2010/0042499 A1* | 2/2010 | Barton | G06Q 30/02 705/14.53 |
| 2010/0082422 A1 | 4/2010 | Heilig et al. | |
| 2010/0082429 A1 | 4/2010 | Samdadiya et al. | |
| 2010/0119111 A1 | 5/2010 | Helfman et al. | |
| 2010/0222035 A1 | 9/2010 | Robertson et al. | |
| 2010/0228592 A1* | 9/2010 | Anderson | G06Q 30/00 705/14.54 |
| 2010/0254525 A1 | 10/2010 | Maly et al. | |
| 2011/0039602 A1 | 2/2011 | McNamara et al. | |
| 2011/0082939 A1 | 4/2011 | Montemurro et al. | |
| 2011/0131109 A1 | 6/2011 | Pappas et al. | |
| 2011/0246890 A1 | 10/2011 | Mellamphy et al. | |
| 2011/0258049 A1 | 10/2011 | Ramer et al. | |
| 2011/0270687 A1 | 11/2011 | Bazaz | |
| 2011/0288913 A1* | 11/2011 | Waylonis | G06Q 30/02 705/14.4 |
| 2011/0288931 A1 | 11/2011 | Kuhn et al. | |
| 2012/0062473 A1* | 3/2012 | Xiao | H04N 5/76 345/173 |
| 2012/0072271 A1 | 3/2012 | Dessert et al. | |
| 2012/0123830 A1 | 5/2012 | Svendsen et al. | |
| 2012/0170521 A1 | 7/2012 | Vogedes et al. | |
| 2012/0179536 A1 | 7/2012 | Kalb et al. | |
| 2012/0215911 A1* | 8/2012 | Raleigh | H04L 12/14 709/224 |
| 2013/0006743 A1 | 1/2013 | Moore | |
| 2013/0018714 A1 | 1/2013 | George | |
| 2013/0060631 A1* | 3/2013 | Corson | G06Q 30/0241 705/14.46 |
| 2013/0211925 A1 | 8/2013 | Holland | |
| 2013/0211941 A1 | 8/2013 | Hallowell et al. | |
| 2013/0304586 A1 | 11/2013 | Angles et al. | |
| 2013/0311293 A1* | 11/2013 | Ward | G06Q 30/0267 705/14.61 |
| 2013/0331027 A1 | 12/2013 | Rose et al. | |
| 2014/0040035 A1* | 2/2014 | Cusack | G06Q 30/02 705/14.61 |
| 2014/0059141 A1 | 2/2014 | Belkin et al. | |
| 2014/0066029 A1* | 3/2014 | Brennan | H04W 4/00 455/414.1 |
| 2014/0080467 A1 | 3/2014 | Urbanek | |
| 2014/0089113 A1 | 3/2014 | Desai et al. | |
| 2014/0136314 A1 | 5/2014 | Kiet et al. | |
| 2014/0278953 A1 | 9/2014 | Ismail et al. | |
| 2014/0379448 A1* | 12/2014 | Gregory | G06Q 30/0607 705/14.17 |
| 2014/0379467 A1* | 12/2014 | Huang | G06Q 30/0281 705/14.53 |
| 2015/0074204 A1 | 3/2015 | Burcham et al. | |
| 2015/0121418 A1 | 4/2015 | Jain et al. | |

OTHER PUBLICATIONS

Decision on Appeal dated Oct. 9, 2012, U.S. Appl. No. 11/491,387, filed Jul. 21, 2006.
Notice of Allowance dated Jan. 8, 2013, U.S. Appl. No. 11/491,387, filed Jul. 21, 2006.
Office Action dated Jan. 6, 2010, U.S. Appl. No. 11/558,021, filed Nov. 9, 2006, 7 pages.
Final Office Action dated Jun. 29, 2010, U.S. Appl. No. 11/558,021, filed Nov. 9, 2006, 28 pages.
Advisory Action dated Sep. 22, 2010, U.S. Appl. No. 11/558,021, filed Nov. 9, 2006, 3 pages.
Office Action dated Jun. 13, 2013, U.S. Appl. No. 11/558,021, filed Nov. 9, 2006.
Final Office Action dated Dec. 26, 2013, U.S. Appl. No. 11/558,021, filed Nov. 9, 2006.
Advisory Action dated Feb. 20, 2014, U.S. Appl. No. 11/558,021, filed Nov. 9, 2006, 3 pages.
Examiner's Answer date Aug. 26, 2014, U.S. Appl. No. 11/558,021, filed Nov. 9, 2006.
Office Action dated Aug. 30, 2010, U.S. Appl. No. 11/557,939, filed Nov. 8, 2006, 52 pages.
Final Office Action dated Jan. 13, 2011, U.S. Appl. No. 11/557,939, filed Nov. 8, 2006.
Advisory Action dated Mar. 22, 2011, U.S. Appl. No. 11/557,939, filed Nov. 8, 2006.
Office Action dated Oct. 31, 2013, U.S. Appl. No. 11/557,939, filed Nov. 8, 2006.
Office Action dated Aug. 5, 2014, U.S. Appl. No. 11/557,939, filed Nov. 8, 2006.
Final Office Action dated Mar. 2, 2015, U.S. Appl. No. 11/557,939, filed Nov. 8, 2006.
Advisory Action dated May 18, 2015, U.S. Appl. No. 11/557,939, filed Nov. 8, 2006.
Office Action dated Dec. 17, 2015, U.S. Appl. No. 11/557,939, filed Nov. 8, 2006.
Office Action dated Sep. 30, 2010, U.S. Appl. No. 11/617,703, filed Dec. 28, 2006.
Final Office Action dated Mar. 25, 2011, U.S. Appl. No. 11/617,703, filed Dec. 28, 2006.
Advisory Action dated Jun. 7, 2011, U.S. Appl. No. 11/617,703, filed Dec. 28, 2006.
Notice of Allowance dated Aug. 1, 2012, U.S. Appl. No. 11/617,703, filed Dec. 28, 2006.
Office Action dated Jul. 21, 2011, U.S. Appl. No. 12/259,187, filed Oct. 27, 2008.
Final Office Action dated Dec. 12, 2011, U.S. Appl. No. 12/259,187, filed Oct. 27, 2008.
Advisory Action dated Feb. 29, 2012, U.S. Appl. No. 12/259,187, filed Oct. 27, 2008.
Office Action dated Dec. 6, 2013, U.S. Appl. No. 12/259,187, filed Oct. 27, 2008.
Final Office Action dated May 27, 2014, U.S. Appl. No. 12/259,187, filed Oct. 27, 2008.
Advisory Action dated Aug. 6, 2014, U.S. Appl. No. 12/259,187, filed Oct. 27, 2008.
Examiner's Answer dated Mar. 12, 2015, U.S. Appl. No. 12/259,187, filed Oct. 27, 2008.
FAIPP Pre-Interview Communication dated Nov. 18, 2015, U.S. Appl. No. 14/024,629, filed Sep. 11, 2013.
Notice of Allowance dated Jan. 28, 2016, U.S. Appl. No. 14/024,629, filed Sep. 11, 2013.
FAIPP Pre-Interview Communication dated Sep. 23, 2015, U.S. Appl. No. 13/956,367, filed Aug. 1, 2013.
Notice of Allowance dated Dec. 16, 2015, U.S. Appl. No. 13/956,367, filed Aug. 1, 2013.
FAIPP Pre-Interview Communication dated Apr. 15, 2016, U.S. Appl. No. 13/911,074, filed Jun. 5, 2013.
FAIPP Pre-Interview Communication dated Apr. 3, 2015, U.S. Appl. No. 14/150,832, filed Jan. 9, 2014.
FAIPP Office Action dated Jul. 2, 2015, U.S. Appl. No. 14/150,832, filed Jan. 9, 2014.
Final Office Action dated Oct. 29, 2015, U.S. Appl. No. 14/150,832, filed Jan. 9, 2014.
Advisory Action dated Jan. 7, 2016, U.S. Appl. No. 14/150,832, filed Jan. 9, 2014.
FAIPP Pre-Interview Communication dated Feb. 16, 2016, U.S. Appl. No. 14/245,822, filed Apr. 4, 2014.
FAIPP Pre-Interview Communication dated Sep. 18, 2015, U.S. Appl. No. 14/494,601, filed Sep. 24, 2014.
First Action Interview Office Action dated Dec. 17, 2015, U.S. Appl. No. 14/494,601, filed Sep. 24, 2014.
Lightningcast, Inc., "Lightningcast Mobile Video Advertising Solution," May 2, 2005, 14 pgs.
Connelly, Francis J., et al., "The Life Cycle Concept as a Long Term Forecasting Model", Academy of Marketing Journal (pre-1986); pp. 455-464, Summer 1974, 2, 3, ABI/INFORM Global.
Fisher, Marshall, et al., Accurate Retail Testing of Fashion Merchandise: Methodology and Application, Marketing Science, vol. 19, No. 3, pp. 266-278, Summer 2000, ABI/INFORM Global.
Kurawarwala, Abbas A., et al., "Forecasting and Inventory Management of Short Life-Cycle Products", Operations Research, vol. 44, No. 1, Jan.-Feb. 1996, pp. 131-150, INFORMS.

(56) References Cited

OTHER PUBLICATIONS

Stratman, Scott, "Allstockedup", Industrial Distribution, vol. 89, No. 11, Nov. 2000, pp. 92-96, ABI/INFORM Global.
Vijayan, Jaikumar, "IBM Service Follows Products After Delivery", Computerworld, vol. 35, No. 28, p. 14, Jul. 9, 2001, ABI/INFORM Global.
Sterling, Greg, "Google Replacing "Android ID" with "Advertising ID" Similar to Apple's IDFA," http://marketingland.com/google-replacing-android-id-with-advertising-id-similar-to-apples-idfa-63636, posted Oct. 31, 2013.
Janssen, Cory, "Identifier for Advertisers (IFA)," http://www.techopedia.com/definition/29032/identifier-for-advertisers-ifa-ifda, Apr. 3, 2014, last accessed Feb. 10, 2015.
The iPhone Wiki, "UDID," http://theiphonewiki.com/wiki/UDID, Apr. 3, 2014, last accessed Feb. 10, 2015.
Google Developer Android, "Advertising ID," http://developer.android.com/google/play-services/id.html, Apr. 3, 2014, last accessed Feb. 10, 2015.
Wikipedia, "Real-time Bidding," http://en.wikipedia.org/wiki/Real-time_bidding, Apr. 3, 2014, last accessed Feb. 10, 2015.
Reynolds, Kevin, "Are Ad Exchanges and Real Time Bidding the Next Big Thing?,"http://www.advertisingperspectives.com/adblog/media-activation/are-ad-exchanges-and-real-time-bidding-the-next-big-thing/, Apr. 3, 2014, last accessed Feb. 10, 2015.
Foreign Communication from a Related Counterpart—International Search Report and Written Opinion, dated Dec. 24, 2014, PCT/US14/54877, filed on Nov. 11, 2014.
Foreign Communication from a Related Counterpart—Preliminary Report on Patentability dated Mar. 24, 2016, PCT/US14/54877, filed on Sep. 10, 2014.
Thierer, et al., "Privacy Solutions (Part 2): Adblock Plus," Technology Liberation Front, Sep. 8, 2008, on line at techliberation.com.
Wikipedia, "Foursuare," https://en.wikipedia.org/w/index.php?title=Foursquare&oldid=681836736, Mar. 2009, last accessed on Sep. 25, 2015.
Barnes, James D., et al., entitled, "In-Flight Campaign Optimization," filed Nov. 9, 2006, U.S. Appl. No. 11/558,021.
Barnes, James D., et al., entitled "Mobile-Device-Based Coupon Management Systems and Methods," filed Apr. 13, 2006, U.S. Appl. No. 11/403,614.
Barnes, James D., et al., entitled, "Inventory Management Integrating Subscriber and Targeting Data," filed Jun. 26, 2006, U.S. Appl. No. 11/474,880.
Barnes, James D., et al., entitled, "Behavioral Analysis Engine for Profiling Wireless Subscribers," filed Nov. 8, 2006, U.S. Appl. No. 11/557,939.
Barnes, James D., et al., entitled, "Advertisement Inventory Management," filed Oct. 27, 2008, U.S. Appl. No. 12/259,187.
Martin, Geoff S., et al., entitled, "Method and System for Providing Custom Background-Downloads," filed Nov. 16, 2007, U.S. Appl. No. 11/280,576.
McConnell, Von K. et al., entitled, "Method and System Using Location History for Targeted Coupon Distribution," filed May 17, 2000, U.S. Appl. No. 09/572,282.
Weaver, Farni, et al., "Method and System for Facilitating Determination of Call-Drop Locations in a Wireless Network," filed Sep. 9, 2003, U.S. Appl. No. 10/658,353.
Burcham, Robert H., et al., entitled "System and Method for Identifying a Mobile Device with Near Real Time Visualization to Action," filed Sep. 11, 2013, U.S. Appl. No. 14/024,627.
Burcham, Robert H., et al., entitled "Methods and Systems of Generating a Unique Mobile Device Identifier," filed Aug. 1, 2013, U.S. Appl. No. 13/956,367.
Holmes, Geoffrey A., entitled "Methods and Systems of Collecting and Segmenting Device Sensor Data for Mobile Device Identification," filed Jun. 5, 2013, U.S. Appl. No. 13/911,074.
Belser, John E., et al., entitled "Ad Management Using Ads Cached on a Mobile Electronic Device," filed Jan. 9, 2014, U.S. Appl. No. 14/150,832.
Burcham, Robert H., et al., entitled "IP Address Hashing in Advertisement Gateway," filed Jan. 21, 2014, U.S. Appl. No. 14/160,196.
Burcham, Robert H., et al., entitled "Client Mediation and Integration to Advertisement Gateway," filed Jan. 21, 2014, U.S. Appl. No. 14/160,206.
Burcham, Robert H., et al., entitled "Address Modification for Advertisement Mediation," filed Jan. 21, 2014, U.S. Appl. No. 14/160,215.
Burcham, Robert H., et al., entitled "Advertisement Mediation of Supply-Demand Communications," filed Jan. 21, 2014, U.S. Appl. No. 14/160,224.
Katzer, Robin D., et al., entitled "Advertisement Dynamic Queue Management," filed Apr. 10, 2014, U.S. Appl. No. 14/250,381.
Hannebaum, Ryan K., et al., entitled, "Advertisement Campaign Target Selection Engine," filed Apr. 4, 2014, U.S. Appl. No. 14/245,822.
Belser, John E., et al., entitled "End User Participation in Mobile Advertisement," filed Sep. 24, 2014, U.S. Appl. No. 14/494,601.
Delker, Jason R., et al., entitled "Swipe Screen Advertisement Metrics and Tracking," filed Nov. 27, 2013, U.S. Appl. No. 61/910,001.
Delker, Jason R., et al., entitled "Ad Management Using Ads Cached on a Mobile Electronic Device," filed Nov. 27, 2013, U.S. Appl. No. 61/910,002.
Burcham, Robert H., et al., entitled "Swipe Screen Advertisement Metrics and Tracking," filed Jan. 28, 2014, U.S. Appl. No. 14/165,569.
Burcham, Robert H., et al., entitled "Categorization of Unknown Variables in a Target Information Database," filed Nov. 4, 2014, U.S. Appl. No. 14/532,969.
Bell, Timothy L., et al., entitled "Method for Consumer Profile Consolidation Using Mobile Network Identification," filed Oct. 20, 2014, U.S. Appl. No. 14/518,504.
Arivukkarasu, Anand, et al., entitled "Telecom Services to Support Retail Fuel Stocking Logistics," filed Nov. 12, 2014, U.S. Appl. No. 14/539,715.
Delker, Jason R., et al., entitled, "Enhanced Dialer for a Mobile Communication Device," filed Mar. 4, 2015, U.S. Appl. No. 14/639,057.
Ferrante, Piero D., et al., entitled, "System and Method for Subscriber Cluster Synthesis," filed Feb. 11, 2015, U.S. Appl. No. 14/619,689.
Office Action—Restriction requirement dated Jun. 17, 2008, U.S. Appl. No. 11/405,195 filed Apr. 17 2006, 7 pages.
Office Action dated Aug. 15, 2008, U.S. Appl. No. 11/405,195, filed Apr. 17 2006, 12 pages.
Final Office Action dated Feb. 26, 2009, U.S. Appl. No. 11/405,195, 17 pages.
Advisory Action dated May 7, 2009, U.S. Appl. No. 11/405,195, 2 pages.
Office Action dated Aug. 18, 2009, U.S. Appl. No. 11/405,195, 17 pages.
Final Office Action dated Oct. 27, 2010, U.S. Appl. No. 11/405,195, filed Apr. 17, 2006.
Office Action dated Feb. 8, 2011, U.S. Appl. No. 11/405,195, filed Apr. 17, 2006.
Final Office Action dated Jul. 22, 2011, U.S. Appl. No. 11/405,195, filed Apr. 17, 2006.
Office Action dated Apr. 6, 2012, U.S. Appl. No. 11/405,195, filed Apr. 17, 2006.
Notice of Allowance dated Dec. 6, 2012, U.S. Appl. No. 11/405,195, filed Apr. 17, 2006.
Office Action dated Feb. 27, 2009, U.S. Appl. No. 11/433,301, filed May 12, 2006, 13 pages.
Notice of Allowance dated Oct. 26, 2009, U.S. Appl. No. 11/433,301, filed May 12, 2006, 7 pages.
Office Action dated Jun. 17, 2008, U.S. Appl. No. 11/403,614, filed Apr. 13, 2006, 7 pages.
Office Action dated Aug. 27, 2008, U.S. Appl. No. 11/403,614, filed Apr. 13, 2006, 11 pages.
Final Office Action dated Mar. 4, 2009, U.S. Appl. No. 11/403,614, filed Apr. 13, 2006, 12 pages.

(56) References Cited

OTHER PUBLICATIONS

Advisory Action dated May 7, 2009, U.S. Appl. No. 11/403,614, filed Apr. 13, 2006, 3 pages.
Office Action dated Aug. 20, 2009, U.S. Appl. No. 11/403,614, filed Apr. 13, 2006, 11 pages.
Final Office Action dated Nov. 8, 2010, U.S. Appl. No. 11/403,614, filed Apr. 13, 2006.
Office Action dated Dec. 3, 2012, U.S. Appl. No. 11/403,614, filed Apr. 13, 2006.
Final Office Action dated Jun. 10, 2013, U.S. Appl. No. 11/403,614, filed Apr. 13, 2006.
Advisory Action dated Aug. 22, 2013, U.S. Appl. No. 11/403,614, filed Apr. 13, 2006.
Office Action dated Nov. 3, 2008, U.S. Appl. No. 11/438,540, filed May 22, 2006, 14 pages.
Final Office Action dated Apr. 28, 2009, U.S. Appl. No. 11/438,540, filed May 22, 2006, 16 pages.
Advisory Action dated Jul. 10, 2009, U.S. Appl. No. 11/438,540, filed May 22, 2006, 3 pages.
Office Action dated Oct. 16, 2009, U.S. Appl. No. 11/438,540, filed May 22, 2006, 12 pages.
Final Office Action dated Apr. 20, 2010, U.S. Appl. No. 11/438,540, filed May 22, 2006, 26 pages.
Advisory Action dated Jul. 2, 2010, U.S. Appl. No. 11/438,540, filed May 22, 2006, 4 pages.
Office Action dated Oct. 14, 2010, U.S. Appl. No. 11/438,540, filed May 22, 2006.
Final Office Action dated Mar. 30, 2011, U.S. Appl. No. 11/438,540, filed May 22, 2006.
Examiner's Answer dated Oct. 27, 2011, U.S. Appl. No. 11/438,540, filed May 22, 2006.
Decision on Appeal dated Apr. 28, 2015, U.S. Appl. No. 11/438,540, filed May 22, 2006.
Notice of Allowance dated Jul. 16, 2015, U.S. Appl. No. 11/438,540, filed May 22, 2006.
Office Action dated Nov. 14, 2008, U.S. Appl. No. 11/474,880, filed Jun. 26, 2006, 17 pages.
Final Office Action dated May 28, 2009, U.S. Appl. No. 11/474,880, filed Jun. 26, 2006, 23 pages.
Advisory Action dated Oct. 19, 2009, U.S. Appl. No. 11/474,880, filed Jun. 26, 2006, 4 pages.
Advisory Action (corrected) dated Oct. 27, 2009, U.S. Appl. No. 11/474,880, filed Jun. 26, 2006, 4 pages.
Office Action dated Mar. 5, 2010, U.S. Appl. No. 11/474,880, filed Jun. 26, 2006, 24 pages.
Final Office Action dated Aug. 18, 2010, U.S. Appl. No. 11/474,880, filed Jun. 26, 2006, 20 pages.
Office Action dated Mar. 30, 2011, U.S. Appl. No. 11/474,880, filed Jun. 26, 2006.
Final Office Action dated Sep. 7, 2011, U.S. Appl. No. 11/474,880, filed Jun. 26, 2006.
Advisory Action dated Nov. 15, 2011, U.S. Appl. No. 11/474,880, filed Jun. 26, 2006.
Examiner's Answer dated May 1, 2012, U.S. Appl. No. 11/474,880, filed Jun. 26, 2006.
Decision on Appeal dated Nov. 18, 2014, U.S. Appl. No. 11/474,880, filed Jun. 26, 2006.
Office Action dated Feb. 25, 2015, U.S. Appl. No. 11/474,880, filed Jun. 26, 2006.
Final Office Action dated Aug. 31, 2015, U.S. Appl. No. 11/474,880, filed Jun. 26, 2006.
Advisory Action dated Oct. 29, 2015, U.S. Appl. No. 11/474,880, filed Jun. 26, 2006.
Supplemental Advisory Action dated Nov. 2, 2015, U.S. Appl. No. 11/474,880, filed Jun. 26, 2006.
Office Action dated Feb. 4, 2009, U.S. Appl. No. 11/491,387, filed Jul. 21, 2006, 9 pages.
Final Office Action dated Aug. 6, 2009, U.S. Appl. No. 11/491,387, filed Jul. 21, 2006, 13 pages.
Advisory Action dated Oct. 19, 2009, U.S. Appl. No. 11/491,387, filed Jul. 21, 2006, 4 pages.
Final Office Action dated May 3, 2016, U.S. Appl. No. 11/557,939, filed Nov. 8, 2006.
Restriction Requirement dated May 19, 2016, U.S. Appl. No. 14/024,627, filed Sep. 11, 2013.
Office Action dated May 17, 2016, U.S. Appl. No. 14/150,832, filed Jan. 9, 2014.
First Action Interview Office Action dated Apr. 28, 2016, U.S. Appl. No. 14/245,822, filed Apr. 4, 2014.
Office Action dated Jul. 1, 2016, U.S. Appl. No. 14/165,569, filed Jan. 27, 2014.
Final Office Action dated Apr. 28, 2016, U.S. Appl. No. 14/494,601, filed Sep. 24, 2014.
Notice of Allowance dated Jul. 22, 2016, U.S. Appl. No. 14/494,601, filed Sep. 24, 2014.
Final Office Action dated Dec. 29, 2016, U.S. Appl. No. 14/165,569, filed Jan. 27, 2014.
Advisory Action dated Mar. 23, 2017, U.S. Appl. No. 14/165,569, filed Jan. 27, 2014.
Office Action dated Aug. 15, 2017, U.S. Appl. No. 14/165,569, filed Jan. 27, 2014.

* cited by examiner

AD MANAGEMENT USING ADS CACHED ON A MOBILE ELECTRONIC DEVICE

CROSS-REFERENCE TO RELATED APPLICATIONS

This application claims priority to and the benefit of U.S. Provisional Patent Application Ser. No. 61/910,001, filed Nov. 27, 2013, entitled "Swipe Screen Advertisement Metrics and Tracking," by Jason R. Delker, et al. and claims priority to and the benefit of U.S. Provisional Patent Application Ser. No. 61/910,002, filed Nov. 27, 2013, entitled "Ad Management Using Ads Cached on a Mobile Electronic Device, by Jason R. Delker, et al., both of which are incorporated herein by reference in their entireties for all purposes.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Advertisements are a beneficial way to promote companies and provide corporations that display advertisements financing that was not available before they displayed the advertisements. An ad presented on a mobile device can be displayed while the mobile device is browsing web sites or interacting with other applications. The ads are relatively limited due to the limited space available for presentation such as a banner across a web page or a side bar on the screen, which is already somewhat limited due to the reduced display area generally available on a mobile device. When an advertisement is displayed on the mobile device, the display can be referred to as an ad experience. Presenting ads on a mobile phone is an opportunity for wireless service providers to capture revenue from advertisers who will pay for ad experiences. Thus, ad experiences may be counted and reported by the mobile device to the wireless service provider in order for the provider to draw revenue from advertisers.

SUMMARY

In an embodiment, a method of displaying an ad on a swipe screen of a mobile device comprises: receiving, at the mobile device, a plurality of ads, storing the plurality of ads in an ad cache in a memory of the mobile device, select an ad from the plurality of ads stored in the ad cache, receiving an input on the mobile device when the mobile device is in a sleep mode, presenting a swipe screen on the mobile device based on the input, and displaying, by the swipe screen application, the ad on the swipe screen on the mobile device.

In an embodiment, another method of displaying an ad on a swipe screen of a mobile device comprises receiving an input on the mobile device when the mobile device is in a sleep mode, presenting a swipe screen on the mobile device based on providing the input, displaying, by the swipe screen application, an ad on the swipe screen on the mobile device, tracking an interaction with the ad on the swipe screen, generating an interaction message comprising the interaction, and sending the interaction message to a server.

In an embodiment, a method of providing feedback on a swipe screen display comprises providing an incentive to activate a swipe screen application, where the swipe screen application is configured to display one or more ads on a swipe screen display of a mobile device, activating the swipe screen application on the mobile device based at least in part on the incentive, receiving an input on the mobile device when the mobile device is in a sleep mode, presenting a swipe screen on the mobile device based on providing the input, displaying, by the swipe screen application, an ad selected from the one or more ads on the mobile device, and providing feedback on the incentive on the mobile device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
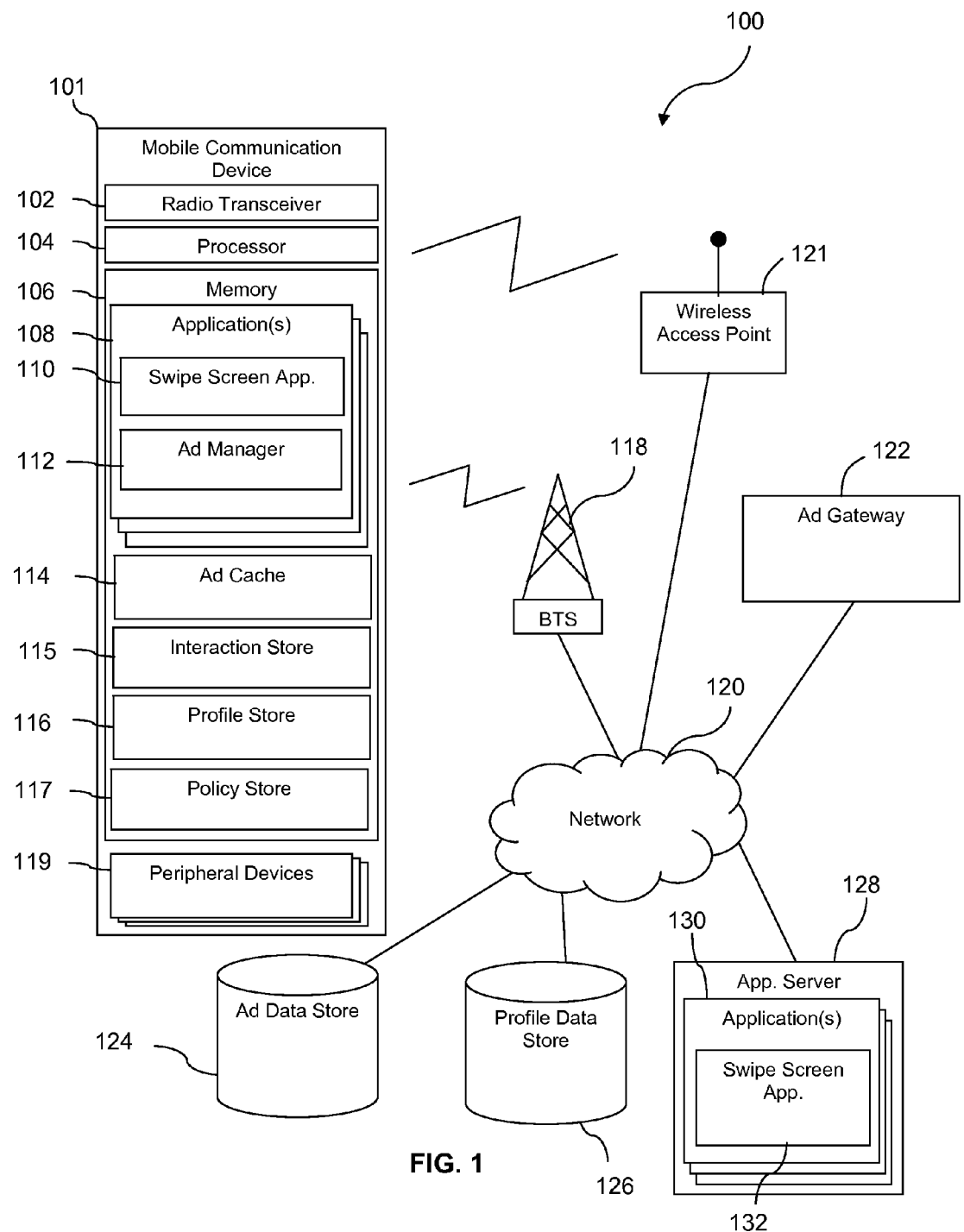
FIG. 1 is a block diagram of a system according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

Disclosed herein are systems and methods for providing advertisements (i.e., ads) having increased display areas and display frequencies by virtue of being displayed on a swipe screen of a mobile device. A swipe screen generally refers to a screen presented in a time sequence after the display of a dark screen, which may also be referred to as a sleep screen display in some contexts, and before the display of a home or desktop display. By responding to a specific gesture to initiate the transition to a lock screen and/or home screen, the swipe screen can be used to prevent inadvertent access or inputs on the mobile device. The swipe screen generally relies on a user providing an input or gesture such as a swipe in a predetermined direction to open the device to the home display. For example, a home button or other input can be depressed or activated to bring up a screen that an receive a gesture such as a swiping motion from one side of the screen to the other in order to reach a lock screen and/or a desktop of home screen of the mobile device. The lock screen, as distinct from the swipe screen, generally responds to a passcode, pattern, or other type of code provided by a user in order to proceed to access the functions of the mobile device.

The swipe screen on most devices covers most of the display area or all of the display area of the mobile device. The swipe screen may be accessed when the phone is transitioned from the sleep mode in which the dark screen is provided to an active mode that allows the user to access the functions of the mobile device. Since a typical user may access their mobile device 50 to 150 times per day, or more in some instances, the opportunity to present an ad on the swipe screen display represents a valuable opportunity for advertisers. Additionally, the large area of the swipe screen display may improve the appeal and/or power of an ad experience. An ad that is presented in or on the swipe screen may be referred to in some contexts as a swipe screen ad.

In an embodiment, the swipe screen ad can be displayed by a swipe screen application. Various incentives can be used to encourage users to obtain, activate, and/or opt-in to the use of the swipe screen application. For example, portions of the revenue generated through the use of the swipe screen ads can be provided to charity. The swipe screen application can then be used to provide feedback to the user on the incentive program. For example, the amount of revenue generated for a charity can be reported on the swipe screen ads to provide feedback to the users. The feedback may be in the form of a collective donation amount that can be displayed in place of an ad or as a portion of the display screen.

The swipe screen ads may not follow a traditional advertisement interaction model. For example, advertisements forming a portion of a web page display may track and/or count user interactions by recording the number of selections of the ad by the user. Further, the selection of and/or clicking on the ad may link a user to the advertiser's website or fetch a second, perhaps larger and more detailed advertisement from the advertiser's server, and the advertiser's website can count those user actions. While a swipe screen advertisement may provide the customary experience count feedback to an advertiser in some cases, the feedback may comprise other metrics such as an interaction with the swipe screen other than the interaction needed to reach the desktop or lock screen. The various input devices associated with the mobile device can be used to record the interaction with the swipe screen ads such as the accelerometer, microphone, input keys, camera, and the like. These interactions may be reported to the communication service provider for feedback to the advertisers. Thus, the swipe screen application may facilitate near real time tracking and feedback on the use of the swipe screen ads.

In some embodiments, the ads that are to be displayed by the swipe screen application may be cached on the mobile device. This swipe screen application may be able to access, load, and display the ads from the ad cache rather than requesting the advertisement each time the swipe screen is displayed. Since the ads can include complex ads having multiple audio-visual components, or even full applications providing for user inputs and responses, the ability to pre-load the ads may limit the amount of communication bandwidth consumed by the fetching of the ads. Further, the ability to cache the ads may also allow the ads to be displayed with a limited perceivable delay. For example, the use of a full application to provide an interactive ad may take several minutes to download and several seconds to initiate and display. Pre-loading the ad may eliminate the need to fetch the ad at the time of the display. Pre-loading the ad may also allow the ad to be initiated and paused for playback without the need for the several second initiation period.

Turning now to FIG. 1, a communication system 100 is described. In an embodiment, the communication system 100 comprises a mobile device 101. The mobile device 101 may comprise a radio transceiver 102, a processor 104, and a memory 106. The memory 106 of the mobile device 101 may further comprise a plurality of applications 108 including a swipe-screen application and an ad manager 112. In some embodiments, the ad manager 112 may be a portion of the swipe screen application 110. The memory of the mobile device 101 may further comprise an ad cache 114, an interaction store 115, a profile store 116, and a policy store 117. The swipe screen application 110 provides a display of an advertisement from the ad cache 114 on a swipe screen display of the mobile device 101.

Figure 2:
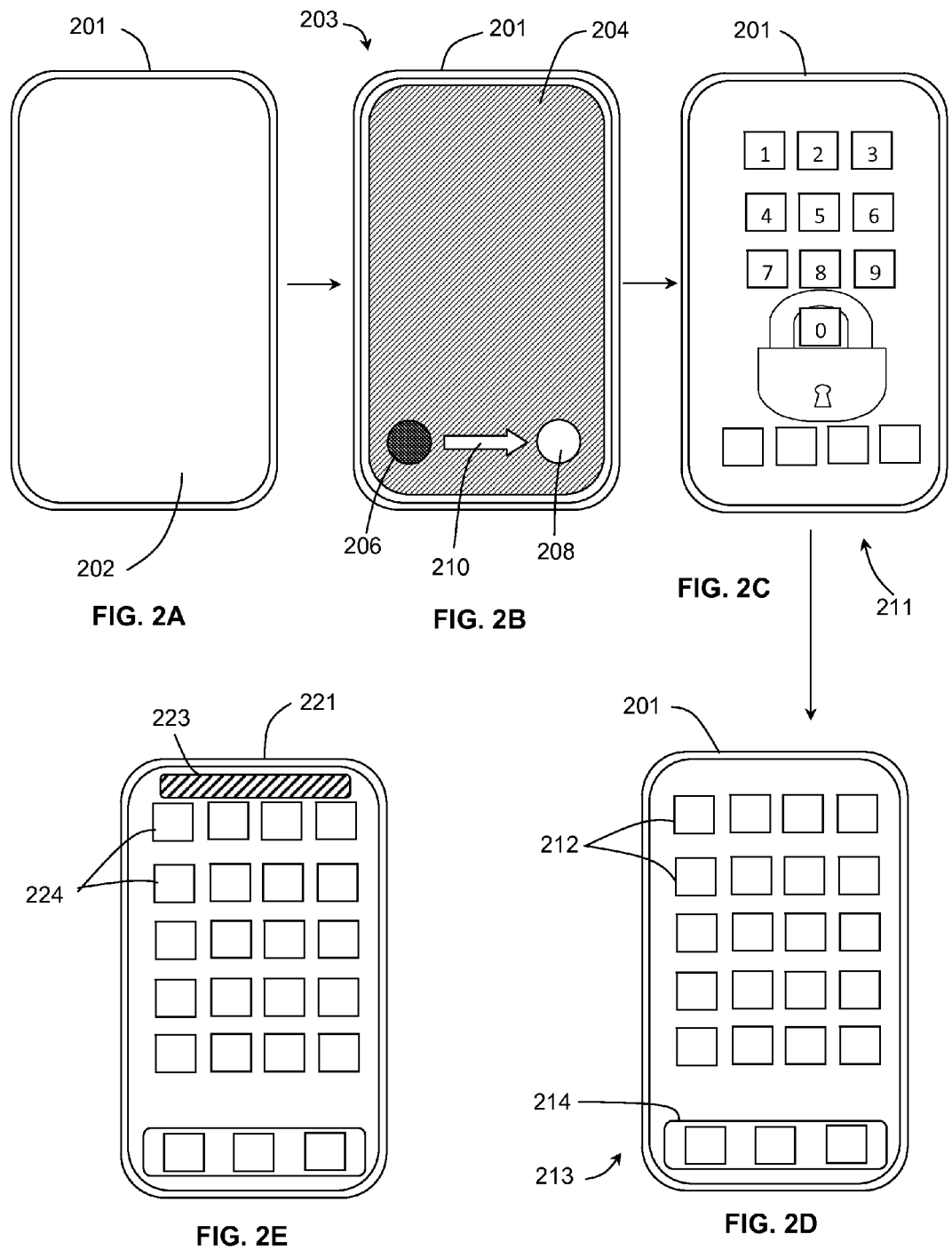
FIG. 2A, FIG. 2B, FIG. 2C, FIG. 2D, and FIG. 2E illustrate a mobile device and exemplary display screens according to an embodiment of the disclosure.

Turning now to FIG. 2A through FIG. 2E, exemplary screens that may be presented by a mobile device 201 are described. FIG. 2A illustrates the mobile device 201 presenting a dark screen 202. As illustrated, the dark screen 202 generally does not display any image and may be used to save on the battery life of the mobile device 201 when the mobile device 201 is in a sleep state. Upon receiving an input, a swipe screen 203 may be presented on the mobile device 201 as shown in FIG. 2B. The swipe screen 203 may be followed by an optional lock screen 211 as shown in FIG. 2C. The lock screen 211 generally responds to a passcode, touch pattern, or other type of code input by a user in order to proceed to access the functions of the mobile device 201. For example, the lock screen 211 may receive an input of a multi-digit passcode into a keypad, a touch input that slides along the screen to make a connection between points, or an input of a word as a key to allow for further interactions with the mobile device 201. When a lock screen 211 is not present, the swipe screen 203 may proceed directly to a home screen 213. When a lock screen 211 is present, the mobile device 201 may proceed to the home screen 213 when the pass code or input is provided.

As shown in FIG. 2D, the home screen 213 may generally comprise one or more application shortcuts 212, and optionally a home bar 214 comprising common applications or functions or selection buttons or icons for activating common applications or functions. The home screen 213 may generally be used to provide the user with an opportunity to interact with the functions of the mobile device 201. As shown by the sequence of screen presentations in FIG. 2A through FIG. 2D, the swipe screen 203 generally refers to a screen presented at a point in a time sequence between the presentation of the dark screen 202 and the presentation of the lock screen 211 and/or the home or desktop screen 213. Said in other words, when transitioning from the presentation of the dark screen 202 to the presentation of the home or desktop screen 213, the swipe screen 203 may be presented after presentation of the dark screen 202 stops and before presentation of the home or desktop screen 213 begins.

As shown in FIG. 2B, the swipe screen 203 may generally comprise one or more input points 206, 208 that can accept an input such as a gesture 210 of moving a touch input from a first touch point 206 to a second touch point 208 to move to the lock screen 211 and/or a home or desktop screen 213. By responding to a specific gesture 210 to initiate the transition to a lock screen 211 and/or home screen 213, the swipe screen 203 can be used to prevent inadvertent access or inputs on the mobile device 201. In addition to the gesture input, the swipe screen 203 can display the ad in an ad display area 204. As shown in FIG. 2B, the ad display area 204 may cover a majority of the display area, and in some embodiments, the ad display area 204 may cover substantially all of the display area. The amount of area available for displaying the swipe screen ads can be compared to an ad location 223 on the home screen display of a mobile device 221 shown in FIG. 2E. In contrast to the ad display area 204 in the swipe screen 203, the ad location 223 may be provided in a margin to allow for the shortcut buttons 224 to remain visible. The area available for ad display on the swipe screen 203 may be larger than the area available for ad display in any other screen presented on the device 201. This larger area may promote a more compelling and/or striking ad experience for users of the device 201, and a more compelling user ad experience may generate more click throughs or other user interactions desired by advertisers.

Returning now to FIG. 1, the swipe screen application 110 may also monitor the user's interactions with the ad and report the interactions to a communication service provider and/or to the advertiser. The ad manager 112 facilitates the loading of the ads into the ad cache 114 and the selection of an ad from the ad cache 114 to display on the mobile device 101. The ad manager 112 can base the ad selection on a number of variables including information in a user profile stored in the profile store 116, rules or policies for displaying ads stored in the policy store 117, contextual information, a priority associated with the ad in the ad cache 114, or any combination thereof, as described in more detail herein. The ad cache 114 contains a plurality of ads that are available on the mobile device 101 for the swipe screen application 110 to display. In an embodiment the mobile device 101 is one of a mobile phone, a laptop computer, a notebook computer, a tablet computer, a personal digital assistant, or a media player. In an embodiment, the mobile device 101 may be implemented as a handset. Details of handsets are discussed further hereinafter.

The communication system 100 may further comprise a base transceiver station (BTS) 118, a wireless access point 121, and a network 120. The network 120 may be communicatively coupled to an ad gateway 122, an ad data store 124, a profile data store 126, and an application server 128. The application server 128 may store applications 130 for use with the mobile device 101 such as the swipe screen application 132. In an embodiment, the base transceiver station 118 may provide a wireless communication link to the mobile device 101 and communicatively couple it to the network 120. In an embodiment, the base transceiver station 118 may provide a wireless communication link to the mobile device 101 according to one of a code division multiple access (CDMA) wireless protocol, a global system for mobile communications (GSM) wireless protocol, a long term evolution (LTE) wireless protocol, a worldwide interoperability for microwave access (WiMAX) wireless protocol, or another wireless communication protocol. The wireless access point 121 may communicatively couple the mobile device 101 to the network 120. The wireless access point 121 or other wireless local area network (WLAN) access point may provide a wireless link to the device 101 and/or the network 120. A number of wireless communication protocols may be used including, but not limited to, WiFi, Bluetooth, and the like.

While one mobile device 101 and one base transceiver station 118 are illustrated in FIG. 1, it is understood that the communication system 100 may comprise any number of mobile communication devices 101 and any number of base transceiver stations 118. The network 120 may be a public communication network, a private communication network, or a combination thereof. In an embodiment, the ad gateway 122 may receive a request from the ad manger 112 to retrieve a plurality of ads. The ad gateway 122 may pull a plurality of ads from the ad data store 124, and sends the plurality of ads back to the ad manger 112. In an embodiment, the ad gateway 122 may pull information related to a particular subscriber from the profile data store 126 so it can select ads from the ad data store 124 that are relevant to the subject subscriber's interests. In some embodiments, the ad gateway 122 may push the profile information from the profile data store 126 to the profile store 116 in the mobile device 101 for use selecting ads for display with the swipe screen application 110.

Initially, the swipe screen application 110 can be loaded on the mobile device 101 in a number of ways. For new mobile devices, the swipe screen application 110 can be pre-loaded at the time of manufacturing, deployment, or branding, each of which can occur prior to the user receiving the mobile device 101. For existing devices, the swipe screen application 110 can be obtained from the application server 128, downloaded, and installed on the mobile device 101. The swipe screen application 110 can be obtained as a standalone application, as a package of applications, or the swipe screen application 110 can form a portion of a larger operating system or application operating on the mobile device 101. In some embodiments, the swipe screen application 110 may be downloaded to the mobile device 101 as part of an update to an existing application or operating system. When installed on the mobile device 101, the swipe screen application 110 can operate independently and/or as part of an operating system or application on the mobile device 101. The swipe screen application 110 may be activated when installed on the mobile device 101, or the swipe screen application 110 may accept an opt-in input from a user prior to being activated on the mobile device 101.

In order to entice users to obtain, activate, and/or opt-in to the swipe screen application 110, an incentive can be provided to entice users to download, activate, and/or opt-in to the features of the swipe screen application 110. In general, the incentive may motivate a user to download the swipe screen application 110 if not already installed on the mobile device 101, activate the swipe screen application 110 once installed, and optionally provide an input to choose to use the swipe screen application 110 when an opt-in input is available. Various incentives can be used to including donations to charity, coupon savings, service cost reductions, and the like.

In an embodiment, the incentive to download and/or activate the swipe screen application 110 may include donations to charity. In general, the display of advertisements generates revenue for a communication service provider. In order to incentivize customers to use the swipe screen application 110, the communication service provider may promise to provide a certain amount of money or services to one or more charity organizations in return for use of the swipe screen application 110. For example, the communication service provider may donate a percentage of the revenues generated from presenting the swipe screen ads, a fixed amount of money per time period, and/or a certain amount of money per advertisement viewed in exchange for a user allowing the swipe screen application 110 to operate on the mobile device 101. In some embodiments, a portion of the income or profits generated by the swipe screen ads can be provided to one or more charity organizations in a non-monetary form such as providing free or discounted communication services, components, mobile devices, or the like rather than directly providing money.

Additional incentives can also be used. In an embodiment, a user can provide preferences or other information to allow the swipe screen application 110 to provide coupons or other discounts to the user in exchange for downloading, activating, and/or opting-in to the swipe screen application 110 on the mobile device 101. For example, a user may enter one or more stores or vendors, and the swipe screen application 110 may provide coupons or discounts at one or more of those stores in exchange for using the swipe screen application 110. Similarly, a communications service provider may offer a discounted service cost in exchange for downloading and/or activating the swipe screen application 110. The discounted service costs may be conditioned on the continued use of the swipe screen application 110 and/or on the number of swipe screen ads that the customer interacts with. Other suitable compensation, deferred costs, discounts, or donations can also be used to incentivize a user of the mobile device 101 to activate and use the swipe screen application 110.

Once activated, the swipe screen application 110 may execute on the processor 104 to provide feedback on the mobile device 101 to further the incentive program. In order to verify the incentive program, data on the incentive program can be communicated to the user using the swipe screen application 110. In an embodiment, the information can be communicated using a message screen in place of an advertisement on the swipe screen display of the mobile device 101. For example, one out of every ten ads may display the total amount of money donated to charity due to the use of the swipe screen application 110. The amount of money displayed may be characteristic of one or more users. For example, the amount of money may be the total amount of money contributed by users of the swipe screen application 110 across a communication service provider. The combined total may further incentivize users due to the relatively large sums that can be accomplished across numerous devices operating the swipe screen application 110. Similarly, the feedback message screen may display the amount of money saved using a coupon incentive, the amount of services provided to charity (e.g., how many minutes have been donated), the amount of items donated to charity (e.g., how many mobile devices 101 have been donated), the amount of money saved using a discounted service plan based on a single swipe screen application 110 user or across a plurality of swipe screen application users (e.g., across all users of the swipe screen application 110).

Rather than provide the feedback in a message screen, the feedback may be displayed as a running total in an overlay on the swipe screen. For example, a running total of the amount of money donated to charity can be displayed as a number and/or chart in a corner of the swipe screen display while an ad is presented. A selection of the feedback display may provide additional details on the totals of the incentive program. In some embodiments, the feedback may be provided as a text message, Short Message Service (SMS) message, or the like. Further, the feedback can be provided periodically, at certain times, upon meeting certain goals (e.g., at donation milestones), and/or upon request from the user of the mobile device 101.

The swipe screen application 110 can be activated on the mobile device 101 as a result of being downloaded to the mobile device 101 and/or as a result of a user input on the mobile device 101 activating the swipe screen application 110. When activated, the swipe screen application 110 may override or replace an existing swipe screen application 110 on the mobile device 101, if one is present. Alternatively, the swipe screen application 110 may insert a swipe screen display on the mobile device 101 upon receiving an activation input.

When activated, the swipe screen application 110 can be executed by the processor 104 and operates to perform several functions. When the display of the mobile device 101 is at a dark screen (e.g., in a sleep mode), an initial input may cause the swipe screen application 110 to display the swipe screen on the mobile device 101. Various initial inputs can be used to awaken or initiate the swipe screen display such as a button being depressed, a touch screen input, a specific action on the device, the formation of a connection (e.g., a connection to a power source, a computer, etc.), and/or an input generated by an application on the mobile device 101 (e.g., an alert, alarm, a message, etc.).

When the initial input is received, the swipe screen application 110 may generate a display comprising an ad selected from the ad cache 114 and present the ad on the mobile device 101. The selection of the ad may be performed by the swipe screen application 110 and/or the ad manager 112 as described in more detail herein. The display may allow for a gesture input from the user to proceed from the swipe screen display to a lock screen and/or the home screen or desktop of the mobile device 101. The swipe screen application 110 may also be configured to accept additional inputs related to interactions with the advertisement. By displaying ads at the swipe screen display, the swipe screen application 110 may present one or more of the plurality of ads available each time the mobile device 101 is accessed by the user as well as presenting the first information seen by the user upon accessing the mobile device 101.

The swipe screen application 110 may execute on the processor 104 and execute in a number of ways. In an embodiment, an ad may be initialized upon receiving the initial input or generating the display. Depending on the type of ad, the initialization of the ad may take several seconds prior to being displayed on the swipe screen display. In some embodiments, the swipe screen application 110 may queue up and/or initiate an ad for display upon the mobile device 101 entering a sleep mode or transitioning to a dark screen. Upon initiating the ad, the ad may start to execute on the processor and then be paused when the ad has loaded and begun to execute. The swipe screen application 110 may be configured to retain the paused ad in memory until the initial input is received. At this time, the paused ad may be restarted and displayed on the swipe screen display. Pausing the ad in this manner may provide a faster display of the ad upon receiving the initial input.

In an embodiment, the ad presented on the swipe screen display may be displayed across all or a substantial portion of the display on the mobile device 101, which can be referred to as a full screen ad in some contexts (e.g., the ad display area 204 as shown in FIG. 2B). The ads may comprise relatively static ads consisting of a display of advertising information, and/or the ads may comprise interactive displays, applications, and/or content. When an ad is relatively static, a user may interact with the ad by providing inputs such as touching, selecting a link, sharing the ad, or a variety of other actions.

The use of interactive ads may allow the user to interact with the ads on the swipe screen display. Rather than link to another source of content, some ads may allow for interactions within the swipe screen display itself. In an embodiment, an advertisement may comprise a game that can respond to an input on a touch screen, keys, an accelerometer, a microphone, a camera, or some other input or peripheral device(s) 119 of the mobile device 101. For example, an advertisement for a new vehicle may allow a user to simulate driving the vehicle by touching a touch screen interface of the mobile device 101 or tilting or rotating the mobile device 101 to interact with an accelerometer of the mobile device 101 to thereby drive the simulated vehicle. In some embodiments, the gesture needed to proceed past the swipe screen may comprise an interaction with the ad. For example, the ad may require a user to drag an object associated with the ad to a certain location in order to provide the gesture. In this example, the ad may be for a desert item, and the gesture needed to proceed past the swipe screen display may comprise dragging an image of the desert item into a mouth. This type of association may prompt the user to interact with the ad to some degree in order to proceed past the swipe screen display. In some embodiments, the user may be able to provide a gesture such as a swipe or tap that can bypass the ad on the swipe screen and proceed to a lock screen and/or desktop or home screen of the mobile device 101.

The various types of inputs resulting from the user interactions with the ads can be recorded by the swipe screen application 110. Since the interactions may not generate a request to an external server or source, a traditional click-through measurement where the user interactions are measured by the vendor may not be applicable to the swipe screen ads. As a result, the swipe screen application 110 may record and store the various types of input and interactions in the interaction store 115. The interactions can be recorded for interactions with the ad prior to receiving an input intended to proceed past the swipe screen display. For example, the swipe screen application 110 can record the interactions with the ad until the input is provided that performs the swipe function or other gesture to proceed past the swipe screen display. When the gesture used to proceed past the swipe screen display is part of the interaction with the ad, the swipe screen application 110 may record the input or gesture in addition to any other interactions with the ad. Various other information associated with the input and interaction such as the name of the ad, ID of the ad, an interaction timestamp, type of interaction, subscriber or user ID, mobile device ID, or the like may be recorded and/or transmitted by the swipe screen application 110. Additional details on the types of interactions generated by the swipe screen ads and the reporting of the interactions to the server can be found in U.S. application. Ser. No. 14/165,569, entitled "Swipe Screen Advertisement Metrics and Tracking," by Robert H. Burcham, et al., and filed on Jan. 27, 2014, which is incorporated herein by reference in its entirety for all purposes.

In an embodiment, the ad manager 112 monitors ad interactions, accumulates counts and/or other data about ad interactions, and sends an ad interaction report to the interaction store 115 on the mobile device 101, the ad data store 124 over the network 120, an advertiser provider server, and/or to a server computer in the wireless service provider's network. In an embodiment, the ad manager 112 may be a part of the swipe screen application 110 so that the swipe screen application 110 performs the monitoring, counting, and reporting functions. The ad interaction report may comprise counts of ad interactions, types of interactions, ad name or other ad identifier, user name or other user identifier, and/or other data about the ad interactions or inputs from the user. Additional data may comprise, for example, information about sharing of the ad, bookmarking the ad, repeated viewing of the ad, and the like. The ad interaction report may be transmitted by the mobile device 101 and/or the ad manager 112 periodically, for example once per day, once every two days, once per week, or at some other periodic interval. Alternatively, the ad interaction report may be transmitted by the mobile device 101 and/or the ad manager 112 on an event, for example, in response to receiving a request to transmit the ad interaction report or in response to the ad interaction report exceeding a threshold size, for example exceeding 100 ad interactions or exceeding a predefined file size.

In an embodiment, the interactions can be sent to the server in near real time. As used herein, near real time refers to an action occurring within about 15 minutes, about 5 minutes, about 1 minute, about 30 seconds, about 20 seconds, or about 10 seconds of the event and may take into account such actions as processing time, system latency, and communication delays. The transmission of the interaction report from the mobile device 101 to a server may provide feedback on the user interactions with the ads to the advertisement providers. The advertisement providers may use the information to provide more targeted advertisements, optimize campaign strategies, generate revenue tracking information, or the like. The interactions may also provide inputs back to the communication service provider to provide updates and feedback to the mobile device 101 on the incentive programs and amounts.

The ad manager 112 may also be configured to load one or more ads into the ad cache 114. The ads in the ad cache 114 can be received from the ad gateway 122, which may receive the ads from the ad data store 124. In general, the ads are stored in an ad cache 114 rather than being requested each time an ad is requested by the swipe screen application 110 to avoid overloading the network connections and to account for times when the network connectivity is unavailable. Further, rich, multi-media ads can be displayed by the swipe screen application 110 that may include ads having a relative large file size and may take greater than thirty seconds or a minute to be downloaded from the network, which may be an unacceptable delay in presenting the ad on the swipe screen display. By placing the ads in the ad cache 114 on the mobile device 101, the ads may be presented faster than when they are downloaded at the time they are to be presented from the network 120.

In an embodiment, the ad manager 112 may update the ads in the ad cache 114 by sending a request to the ad gateway 122 for a plurality of ads. The ad gateway 122 may select a plurality of ads from the ad data store 124. The ad selection can be based on a number of factors including a relative importance of the ads, profile data from the profile data store 126 on the user of the mobile device 101, active advertisement campaigns, and the like. The ad gateway 122 may then transmit the plurality of ads to the ad manger 112. Upon receiving one or more of the ads, the ad manager 112 can store the ads into the ad cache 114. The ad cache 114 can store a plurality of ads. In an embodiment, the ad cache 114 can store at least about 20 ads, at least about 30 ads, at least about 40 ads, at least about 50 ads, or at least about 60 ads.

In an embodiment, the ads may be updated in the ad cache 114 by being pushed from one or more sources coupled to the network 120, such as by the ad gateway 122. The service provider may generate an ad payload comprising one or more ads, and the service provider may send a notification to the mobile device 101 that the ad payload is available for updating the ad cache 114. The mobile device 101 may retrieve the ad payload from the ad data store 124, and the ad manager 112 may process the ad payload. The ad manager 112 may retrieve the ad payload based on certain restrains, which are described in more detail herein. In some embodiments, the ad gateway 122 may send the ad payload to the mobile device 101 without first sending a notification. The ability of a network element such as the ad gateway 122 to initiate the transfer of ads into the ad cache 114 may allow for dynamic updating and display of the ads on the swipe screen display. The dynamic updating may allow for new advertising campaigns, targeted ads, and the like to be distributed to a mobile device 101.

The ads loaded into the ad cache 114 may consume network resources during the transfer to the mobile device 101. As a result, the ads may be pulled or pushed from the network 120 at specific times, based on a specific network connection types or connection bandwidth, based on the available memory in the mobile device 101, and/or based on the priority of the ads. In an embodiment, the ads may be loaded into the ad cache 114 at off-peak hours, for example on nights or weekends. In an embodiment, the ad manager 112 can be configured to retrieve the ads between midnight and 2:00 AM at the local time of the mobile device 101 to avoid consuming network bandwidth during peak usage times. The ad manager 112 may also retrieve the ads at night on a weekend. In some embodiments, the network 120 may send a notification to the mobile device 101 indicating that the network resources are below a threshold and the ad manager 112 can proceed to download the ads.

In an embodiment, the ad manager 112 may download and/or receive one or more ads based on the specific network connection types. The network connection type or connection bandwidth can affect the types of ads downloaded, the number of ads downloaded, and/or the rate at which the ads are loaded. In an embodiment, the downloading of ads may be restricted based on the connection type. Various connection types including short range connections such as Wi-Fi and cellular connections such as 2G, 3G, 4G, and Long Term Evolution (LTE) may each have different bandwidths and connection data rates. In an embodiment, the ads may only be loaded when a certain connection type is detected. For example, the loading of ads may be limited to short range connections such as Wi-Fi. In this embodiment, the ad manager 112 may monitor the connection type of the mobile device 101, for example by monitoring the connection type of the radio transceiver 102, and determine when a short range connection is available. When a short range connection becomes available, the ad manager 112 may initiate the ad download, thereby updating or replacing the ads in the ad cache 114 over the short range connection. In some embodiments, a 3G or higher data rate connection may be preferred prior to downloading the ads.

The ads may also be downloaded at a rate based on the specific connection type available. In order to prevent overloading the network 120 and/or the other connections being used by the mobile device 101, the ad manager 112 may select to download one or more ads at a rate that is less than a full data rate connection. For example, the ads may be downloaded at less than about 75%, less than about 50%, or less than about 25% of the full data rate of the available connection. The swipe screen application 110 may continue to function based on the available ads in the ad cache 114 during the ad download process.

The type of ad downloaded may be based on the connection type available. As noted above, the types of ads that can be displayed on the swipe screen display can range from relatively static ads to fully interactive ads having high definition graphics that provide a fully interactive user experience. In some embodiments, one or more of the ads may comprise executable applications, which may allow for increased interactions based on the available input devices associated with the mobile device 101. The relative file size of the ads may vary depending on the level of interaction, graphics, and the like. For example, static ads may have smaller file sizes than larger, interactive ads. In an embodiment, lower connection speed or bandwidth connections may be limited to downloading ads having smaller file sizes. Each connection type may have a threshold file size associated with it. In an embodiment, the ad manager 112 may be configured to identify the type of connection with the network 120, identify the file size of one or more ads, and only download those ads having a file size less than or equal to the file size threshold set for each connection type. This process may allow ads to be delivered to the mobile device 101 with lower speed connections.

The ad manager 112 may also selectively download the ads based on the available memory of the mobile device 101 and/or the memory allocated to the ad cache 114. The available memory 106 on a mobile device 101 may vary depending on the amount of memory consumed by other applications and data. While the size of the memory assigned to the ad cache 114 may be dynamic, it will generally be less than or at least limited by the available memory on the mobile device 101, including removable storage in some embodiments. The ad manager 112 may be configured to selectively download one or more ads based on the available memory. For example, the ad manager 112 may download less than the available number of ads based on receiving a number of ads that take up less than or equal to the available memory. In some embodiments, the ad manager 112 may attempt to optimize the number of ads to provide a threshold number of ads based on the available memory. For example, the ad manager 112 may download ten static ads rather than a single fully interactive ad in order to meet a minimum number of available ads while having a limited amount of memory.

The ad manager 112 may also be configured to selectively download ads based on a priority assigned by the ad gateway 122. The ads may be ranked by the communication service provider and/or an advertisement provider, with more important or higher priority ads being given a higher priority value. For example, an advertisement provider may pay more to advertise a new product during a product launch, which may result in the ads for the new product receiving a higher priority based on the higher advertisement value. The ad manager 112 may prioritize the advertisement downloads based on the priority assigned by the ad gateway 122. For example, the highest priority ads may be downloaded first. The priority of the ads may be considered in addition to any of the other considerations for downloading ads as described herein. For example, when a limited amount of bandwidth or memory are available, the ad manager 112 may elect to download the highest priority ad within the available bandwidth or memory limitations.

In an embodiment, the ad manager 112 monitors the ads in the ad cache 114 and can selectively replace the ads. The ads in the ad cache 114 may be replaced based on the number of times the ad is displayed on the swipe screen display, a given date or time range, a limited number of interactions with the ad, and the like. When the ad manager 112 determines that an ad should be replaced, it may remove the ad from the ad cache 114 or otherwise remove it from a list of ads being sent to the swipe screen application 110 for display on the swipe screen of the mobile device 101. The ad manager 112 may then selectively reload the ad cache 114 with one or more additional or replacement ads.

In an embodiment, the ad manager 112 can be configured to apply user profiles and/or policies to obtain a subset of the ads in the ad cache 114 for presentation on the swipe screen display. The ad manager 112 may apply one or more policies or rules from the policy store 117 and/or apply one or more rules based on a user profile stored in the profile store 116. The policy store 117 may comprise rules established by the communication service provider and/or an advertisement provider for controlling the display of the ads on the swipe screen display. The rules may be used in determining ads for a demographic group, determining the frequency at which an ad can be displayed, determining the time during which the ad can be displayed, determining a display based on a priority of the ad, determining a context in which the ad is displayed, coordinating an ad with an external marketing campaign, and combinations thereof. In general, the ads can be selected from the ad cache 114 on a round robin type selection scheme. However, the application of the policies and profile information may result in less than all of the ads being displayed from the ad cache 114 and/or the ads appearing in a different order and/or at a different frequency than the manner in which the ads are stored in the ad cache 114.

In an embodiment, the policies may comprise rules for selecting ads based on a demographic group. Each ad may be selected based on one or more demographic characteristics including, but not limited to, one or more of gender, ethnicity, age, financial status, educational level, and interests. The policies can be combined with demographic information for a user stored in the profile store 116 and/or obtained from the profile data store 126 through the network 120. When the ads are filtered on the mobile device 101, the demographic data for a user may be pushed from the profile data store 126 to the profile store 116 on the mobile device 101. The profile store 116 can include demographic information specific to the user of the mobile device 101 including, but not limited to, one or more of gender, ethnicity, age, financial status, educational level, and interests.

When combined with the policies, ads that qualify based on the policies and the corresponding demographic profile can be selected for presentation on the swipe screen of the mobile device 101. For example, a product having a target audience of males aged 18 to 35 may have an associated policy filtering out the ad for any user that is not a male and is not in the age group ranging from 18 to 35. When the demographic information in the profile store 116 indicates that the user is a 55 year old female, the ad manager 112 may determine, based on both the policies for the ad from the policy store 117 and the demographic information from the profile store 116, that the ad should not be displayed on the swipe screen display. In this embodiment, the ad may be deleted from the ad cache 114 or simply not be displayed. In another embodiment, when the demographic information in the profile store 116 indicates that the user is a 25 year old male, the ad manager 112 may determine, based on both the policies for the ad from the policy store 117 and the demographic information from the profile store 116, that the ad should be displayed on the swipe screen display. In this embodiment, the ad may be flagged, marked, placed in an ad rotation, or otherwise included in a list of ads to be sent to the swipe screen application 110 for display on the swipe screen display.

The ad manager 112 may be configured to determine, based on the ad policies in the policy store 116, the frequency at which an ad is displayed on the swipe screen display. As noted above, the swipe screen display may be accessed numerous times each day. As a result, the ads may be displayed a plurality of times each day, and the potential for numerous displays of an ad may be possible. In order to limit the total number of displays of an ad in a certain time period, the number of displays per time period may be a parameter stored in the policy store 117. For example, an ad may have a threshold limit number of displays each day. When the ad has been displayed a number of times equaling the limit, the ad manager 112 may be configured to prevent the ad from being displayed for the remainder of the day. The ad may then not be displayed until the next time period. In some embodiments, the ad manager 112 may be configured to limit the time between each viewing of the ad. In some embodiments, the ad manager 112 may also be configured to determine the total number of times an ad can be displayed. This may include the total number of times an ad can be displayed within a certain time period a total number of times an ad can be displayed on a given mobile device, and/or a total number of times an ad can be displayed for a given marketing campaign across a plurality of mobile devices.

In an embodiment, the ad manager 112 may be configured to determine, based on the ad policies in the policy store 116, one or more time periods during which the ad can be displayed. The policy store 116 may comprise rules for the time period or time periods during which the ad is displayed. For example, an ad for a breakfast cereal may be limited to the morning hours such as between five and ten o'clock in the morning. Other time periods may also be used to determine when an ad is displayed including, but not limited to, the time of day, day of the week, week of the year, season of the year, special occasions, event, or holidays, and any combination thereof. Additional time periods may be used to define advertising campaigns. For example, the time period may define a two month period during which the ad can be displayed. The ad may be distributed prior to the two month window, and the ad manager 112 may be configured to prevent the ad from being selected from the ad cache 114 until the window opens. The ad may then be displayed in accordance with the policies and profiles until the end of the display window. Such pre-distribution may allow more devices to receive the ad in preparation for the launch of the campaign without overloading the network 120 immediately prior to the campaign launch.

The ad manager 112 may also be configured to select an ad for display on the swipe screen display based on a priority associated with the ad. In an embodiment, the policies stored in the policy store 117 may be used by the ad manager 112 to select one or more ads based on the priorities of the ads. The priorities may be set within the ad and/or updated over time based on messages received from the ad gateway 122. For example, an ad can be reprioritized after it is downloaded based on a message from the ad gateway 122 to the ad manager 112. In an embodiment, the ad manager 112 may utilize the priorities to provide a preference to an ad with a higher priority. This may result in the higher priority ad being displayed more frequently than a lower priority ad. In some embodiments, the ad manager 112 may select to display the highest priority ad first, followed by the next highest priority ad, and so forth.

The ad manager 112 may also be configured to base the selection of the ad on the context in which the mobile device 101 is operating. The context can refer to the operating environment of the mobile device 101 such as the other applications or inputs that are received, and/or the context can refer to the physical location of the mobile device 101 or activity in which the user of the mobile device 101 is engaged. In an embodiment, the ad manager 112 may select an ad based on the context of the operating environment of the mobile device 101. In this embodiment, the ad manager 112 may determine if additional applications are operating on the mobile device 101. An ad that is related to one of the other applications can then be selected for display. Further, inferences as to the demographic of a user may also be determined by the ad manager 112 based on the applications, inputs, or other items operating or displayed on the mobile device 101. For example, if a children's application is operating on the mobile device 101, the ad manager 112 may determine that the adult user of the mobile device 101 described by the profile information may not be operating the mobile device 101. Rather, a child may be operating the mobile device 101, and an ad directed to a child may be selected for display upon the next activation of the swipe screen application 110.

In some embodiments, the ad manager 112 may determine the context of the mobile device 101 in terms of the physical operating location or the activity in which the user of the mobile device 101 is engaged. In an embodiment, the ad manager 112 may utilize a location determination in the selection of one or more ads to send to the swipe screen application 110. The physical location may be associated with a retail location, a nearby shopping opportunity, a regional offer, or the like. The location determination can be based on a global positioning system (GPS) sensor and/or receiver within the mobile device 101. In another embodiment, the location of the mobile device 101 may be determined based on an available Worldwide Interoperability for Microwave Access (WiMAX) access point, an available WiFi access point, an available femtocell access point; or other available wireless access points regardless of whether the mobile device 101 is actually connected to the available wireless access point. For example, the mobile device 101 may receive a broadcast signal from a wireless access point that contains an identifier for the subject access point. In this case, the indication of current location may comprise an identity of one access point, identities of a plurality of access points, or other information about what wireless access points are in range of the mobile device 101.

The ad manager 112 may deem that the mobile device 101 is within an acceptable proximity of a preferred location, such as a retail store location, if the mobile device 101 is in range of one or more predefined wireless access points, where the subject predefined wireless access points are associated with their identities. In an embodiment, the location of the mobile device 101 may be determined based on triangulation of the strength of signals between a plurality of available wireless access points. In an embodiment, the location may be determined based on using combinations of different types of location determination methods. As such, the disclosed methods and systems are not limited to a particular method of determining the location of the mobile device 101.

When the location determination is provided to the ad manager 112, the ad manager 112 may select an ad related to the location. For example, when the ad manager 112 determines that a mobile device 101 is located within a retail store, an ad related to the retail store such as discounts or promotions for the store or products sold by the store may be selected from the ad cache 114. In an embodiment, a message may be sent by the ad manager 112 to the ad gateway 122 to request an ad related to the retail store when none of the ads in the ad cache are related to the retail store. Any ads returned in response to the message may then be sent to the swipe screen application 110 for display on the mobile device 101. The ads may be returned via a short range access point (e.g., a WiFi access point) associated with the retail store, which may be the source of the location determination.

The ad manager 112 may also determine the context of the mobile device 101 in terms of an activity in which the mobile device 101 is engaged. In an embodiment, one or more sensors associated with a mobile device 101 can be used to determine an activity in which the user of the mobile device 101 is engaged. For example, the ad manager 112 can determine that a user is walking based on the inputs from an accelerometer associated with the mobile device 101 indicating a periodic motion associated with walking as well as inputs from a location device that can indicate that the user is moving at a walking speed on a sidewalk. Similar determinations may be made with respect to running, biking, swimming, hiking, boating, riding in a car, and the like. Upon determining a characteristic sensor inputs for a specific activity, the ad manager 112 may select an ad based on the activity at the time of the activity or at a later time. For example, the ad manager 112 may select a running shoe advertisement upon determining that the mobile device 101 is associated with a user engaged in a jog. The running shoe ad may be displayed when the swipe screen is activated during the jog and/or at a later time such as the first swipe screen activation after the jog is completed. While running is described as an example, other activity related ads can be selected based on any of the other types of activities.

The ad manager 112 may also be configured to select an ad from the ad cache 114 based on coordinating the ad with an external marketing campaign. As used herein, the term external marketing campaign refers to a set of ads originating from and presented outside of the mobile device 101, for example appearing on a televised display, an online display, radio display, or some other advertisement display. The ability to select an ad based on the external marketing campaign may allow an advertiser to present coordinated ads over multiple communication channels to customers.

In an embodiment, the ad manager 112 may select a coordinated ad in several ways. The ad to be coordinated may be pre-loaded in the ad cache 114 as described herein. The policy store 117 may comprise a rule that makes the ad the highest priority ad during the coordination period, thereby inducing the ad manager 112 to select the ad to send to the swipe screen application 110 during the coordination period. In some embodiments, the priority may be changed based on a message from the ad gateway 122. For example, the ad gateway 122 may send a message to the ad manager 112 overriding the available policies in the policy store 117 and directing the ad manager 112 to select the ad during the coordination period. If the swipe screen display is activated during the coordination period, the ad may be the first and/or only ad displayed. Various other actions may be used to trigger the display of the ad on the mobile device 101 during a coordination period in which another related ad is being displayed on an external communication medium.

As an example of a coordinated ad event, the ad manager 112 may select an ad coordinated to an ad being displayed during a commercial on a televised display of the Superbowl. For example, a car ad may be televised during a commercial break. Since the ads that are televised during the Superbowl are scheduled in terms of order, the ad gateway 122 may be aware of when the car ad will be displayed. However, since the exact time may not be known, the ad gateway 122 may push a message to the mobile device 101 at or slightly before the time during which the car ad is to be displayed. The message may direct the ad manager 112 to select a corresponding car ad in the ad cache 114 for the swipe screen display and send the corresponding ad to the swipe screen application 110. The swipe screen application 110 may initiate the corresponding ad and pause the display until the swipe screen is activated. Upon activation of the swipe screen display, the corresponding ad may be displayed on the swipe screen display. For a user watching the Superbowl, the user may watch the car ad on the broadcast display. If the user then accesses the mobile device 101, the swipe screen application 110 may initiate the corresponding car ad on the swipe screen display. This coordinated advertising campaign may be used to present any number of corresponding ads on the swipe screen display, and the coordinated advertising campaign may be used with any type of external advertising campaign or special event.

The application of the policies from the policy store 117 and/or the user profile information from the profile store 116 may occur at or near the time the ads are received from the network 120 and stored in the ad cache 114. In some embodiments, the ad manager 112 may apply the policies and profiles at the time the ad is selected to be sent to the swipe screen application 110. In still other embodiments, the ad manager 112 may apply the policies and profiles between the time the ads are received and stored in the ad cache 114 and the time the ads are sent to the swipe screen application 110.

Figure 3:
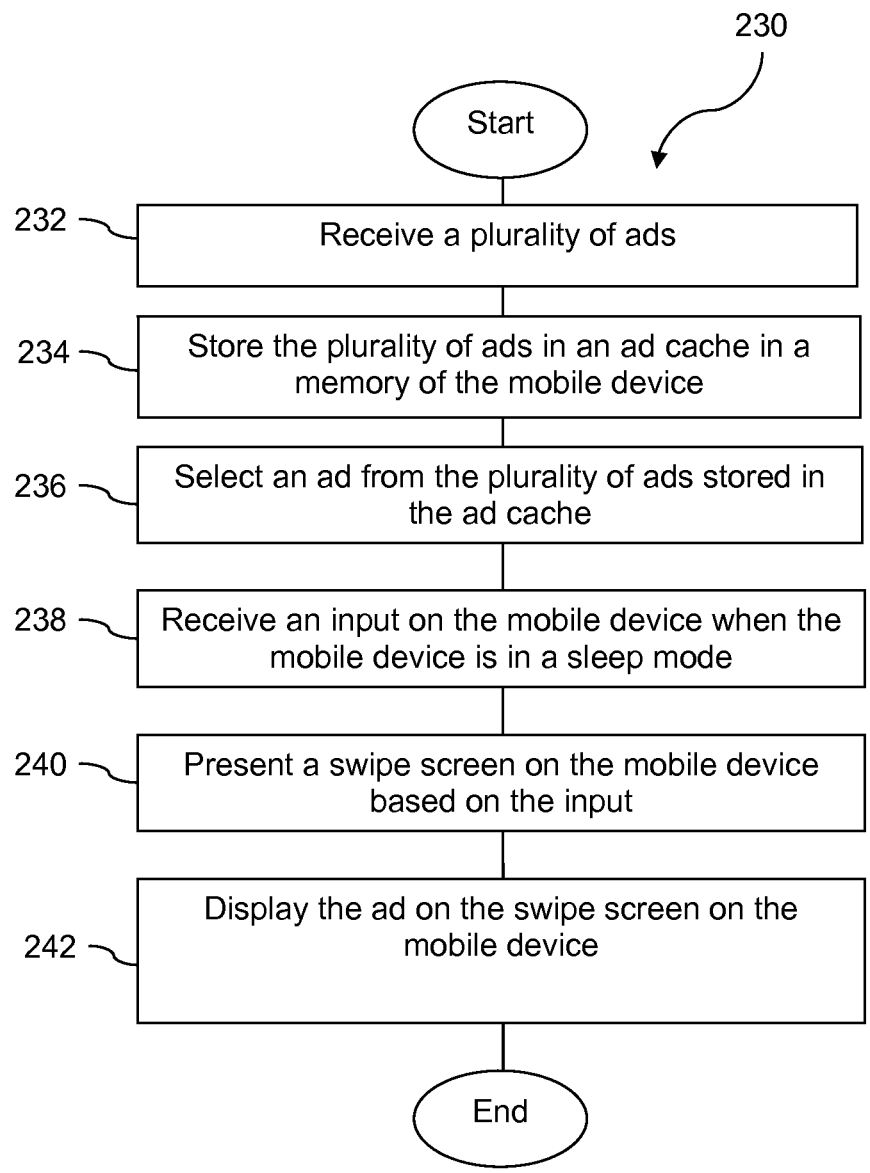
FIG. 3 is a flow chart of a method according to an embodiment of the disclosure.

Turning now to FIG. 3, a method 230 of displaying an ad on a swipe screen of a mobile device 101 is described. At step 232, a plurality of ads can be received at the mobile device 101. The ads can be received from the ad gateway 122 based on a number of considerations such as a network connection type, a network connection bandwidth, an available memory of the mobile device 101, a priority of one or more of the plurality of ads, or any combination thereof.

The plurality of ads can be stored in an ad cache 114 in a memory 106 of the mobile device 101 in step 234. An ad can be selected form the plurality of ads stored in the ad cache 114 in step 236. As described above, selecting the ad from the plurality of ads can comprise applying information from a user profile stored in the profile store 116 and/or one or more policies stored in the policy store 117 to one or more of the plurality of ads stored in the ad cache 114. In an embodiment having targeted ads, the ad may be selected by retrieving a user profile that comprises user demographic information for a user of the mobile device 101, retrieving one or more policies that comprise demographic rules for the plurality of ads, applying the one or more policies to the user profile for the plurality of ads, and determining that the ad comply with the one or more demographic rules based on the user demographic information. When the ad complies with the demographic rules based on the user profile, the ad can be selected to be displayed on the swipe screen of the mobile device 101.

In some embodiments, the one or more policies may be applied directly to the ads. For example, the one or more policies may comprise a frequency threshold for displaying the ad on the swipe screen, and the ad may be displayed at a rate equal to or less than the frequency. Similarly, the one or more policies may comprise one or more time periods for displaying the ad on the swipe screen, and the ad may be displayed within the one or more time periods. In some embodiments, the one or more policies may comprise a context for displaying the ad on the swipe screen such as an operating context or an activity context, and the ad may be displayed during an activity meeting the context. In an embodiment, the ad may be selected based on a coordinated marketing campaign. In this embodiment, a display message can be received at the mobile device 101 comprising instructions to display an ad selected from the plurality of ads during a first time period. The ad may be displayed on the swipe screen during the first time period while a related ad is displayed on an external medium (e.g., a broadcast event, etc.) during the first time period.

An input can be received on the mobile device 101 when the mobile device 101 is in a sleep mode in step 238. The sleep mode or dark screen may represent a state or mode of the device in which a display is not presented on the display screen of the mobile device 101. Upon receiving an input including a touch, a key input, a power button input, a connection to an external source (e.g., a power cord, USB connection, etc.), or an internally generated input within the mobile device 101, the mobile device 101 may transition from the sleep mode to an awake mode in which the display of the mobile device 101 becomes active. In an embodiment, a swipe screen can be presented on the mobile device 101 based on the input in step 240 as the mobile device 101 transitions to the awake mode.

The ad selected from the plurality of ads can then be displayed on the swipe screen of the mobile device 101 in step 242. The user may then have the option of interacting with the ad using one or more of the input devices on the mobile device 101, and/or the user can provide a gesture to proceed past the swipe screen display to a lock screen and/or home screen of the mobile device 101. This process may be repeated to display other ads on the swipe screen display of the mobile device 101, for example, each time the swipe screen is displayed on the mobile device 101. Over time, the ads in the ad cache 114 can be updated. The ads can be updated based on one or more factors or considerations including, but not limited to, a network connection type, a network connection bandwidth, an available memory of the mobile device 101, a priority of one or more of the ads, or any combination thereof.

Figure 4:
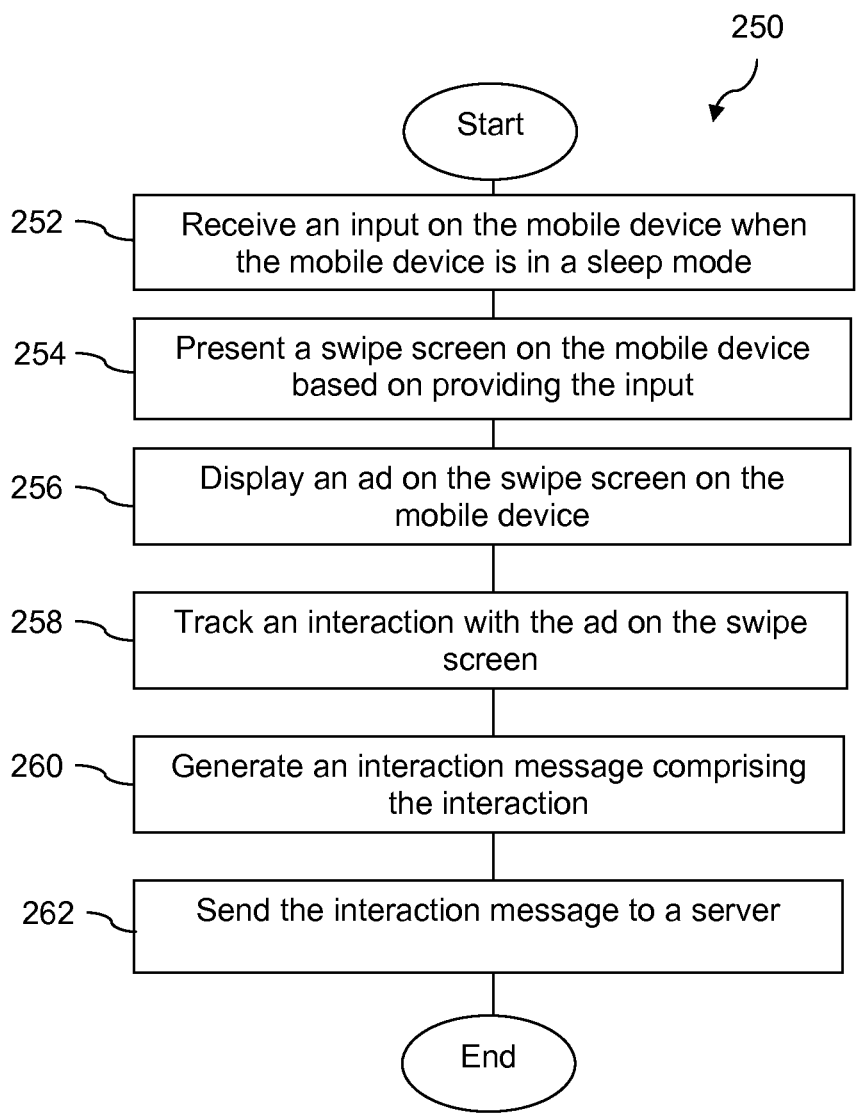
FIG. 4 is a flow chart of another method according to an embodiment of the disclosure.

Turning now to FIG. 4, a method 250 of displaying an ad on a swipe screen of a mobile device 101 is described. At step 252, an input can be received on the mobile device 101 when the mobile device 101 is in a sleep mode. The swipe screen can be presented on the mobile device 101 based on providing the input in step 254.

An ad can be displayed on the swipe screen of the mobile device 101 in step 256. For example, the swipe screen application 110 can execute on a processor 104 to generate the swipe screen display having the ad. In an embodiment, the swipe screen application 110 may display the ad by initiating the ad in response to the mobile device 101 transitioning from an awake or use mode to a sleep mode. Once the ad has loaded and is ready for display, the ad can be paused and held in memory pending the mobile device 101 transitioning from the sleep mode to the awake or use mode. Once the mobile device 101 has been awakened, the ad can be resumed for display on the swipe screen of the mobile device 101. In some embodiments, the display of the ad on the swipe screen display can include displaying the ad across substantially all of the display of the mobile device 101, which can be referred to in some contexts as a full screen display.

An interaction with the ad on the swipe screen can then be tracked in step 258. The ad displayed on the swipe screen can be configured to receive interactions from one or more input devices associated with the mobile device 101 and/or receive a gesture on the swipe screen to allow the mobile device 101 to proceed to at least one of a lock screen or a home screen of the mobile device 101. When the ad is configured to receive interactions from the one or more input devices, the ad may be referred to as an interactive ad. For interactive ads, tracking the interactions with the ad can include recording the inputs on the one or more input devices.

An interaction message comprising the interaction or interactions with the ad can then be generated in step 260. In an embodiment, the interactions can include a record of the inputs received on the one or more input devices on the mobile device 101 associated with the ad displayed on the swipe screen display. The interaction message can then include the record of the inputs. In some embodiments, the interaction message can include additional inputs such as the gesture configured to proceed past the ad to a lock screen and/or home screen of the mobile device 101.

The interaction message can be sent to a server in step 262. In some embodiments, the interaction message can be reported to a server in near real time, which may allow the communication service provider and/or an advertisement provider to receive feedback on the user interactions with one or more of the ads.

Figure 5:
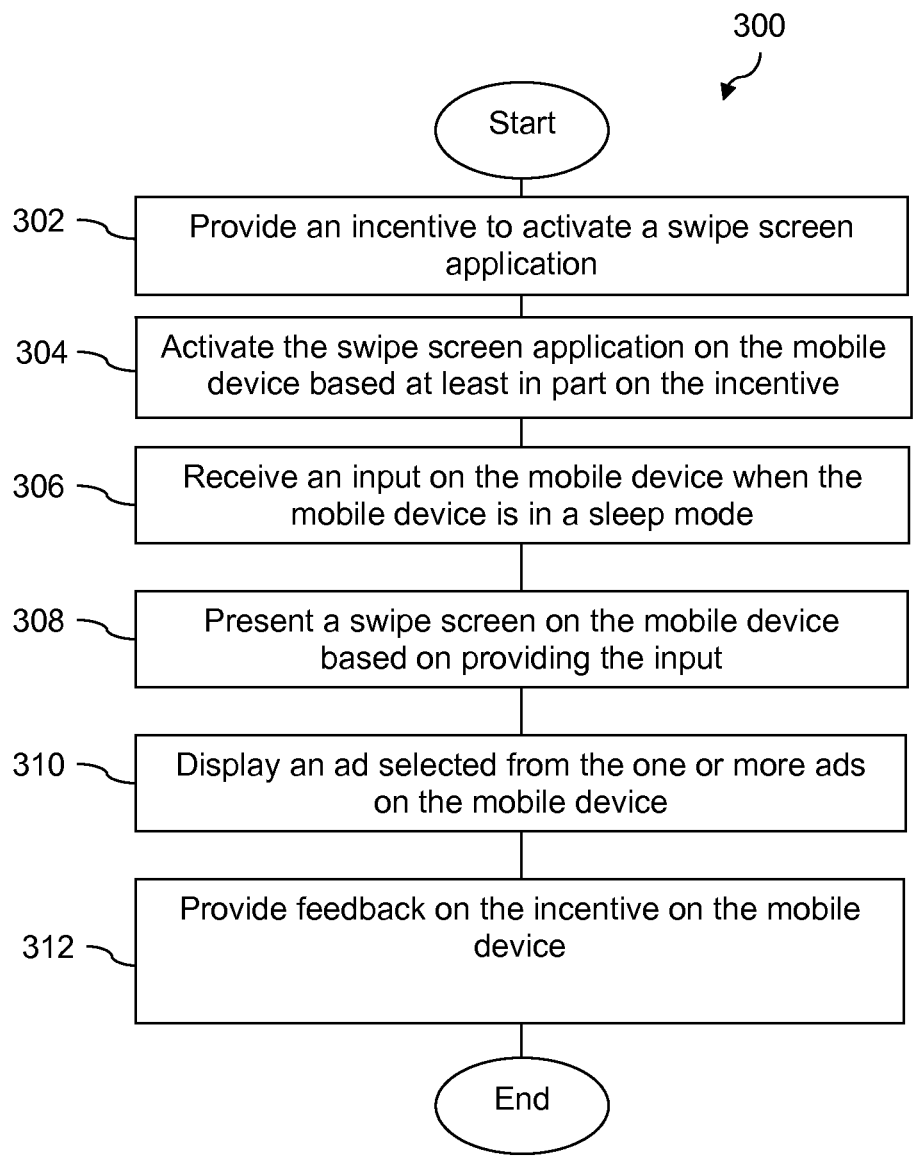
FIG. 5 is a flow chart of still another method according to an embodiment of the disclosure.

Turning now to FIG. 5, a method 300 of providing feedback on a swipe screen display is described. The swipe screen display may be used to display one or more ads on the mobile device 101, for example, using a swipe screen application 110. At step 302, an incentive to active a swipe screen application 110 on a mobile device 101 can be provided. Various incentives can be provided to entice users to obtain and activate the swipe screen application 110. For example, the incentive may comprise a donating at least a portion of an income derived from the displaying the ads on the swipe screen to one or more charities. The revenues may be derived from advertiser providers to a communication service provider for being able to display the ads on the swipe screen display. Other incentives can include customer discounts, donations of services or devices to charity, or any of the other incentives described herein.

The swipe screen application 110 can be activated on the mobile device 101 based at least in part on the incentive in step 304. In order to activate the swipe screen application 110, it can be downloaded to the mobile device 101. The download may occur as part of an initial set-up of the device prior to being received by the user, as part of an application download, and/or as part of a system update. In some embodiments, the swipe screen application 110 is activated by a user in order for the swipe screen application 110 to display the ads on the swipe screen of the mobile device 101. In some embodiments, the swipe screen application 110 may be activated when it is downloaded on the mobile device 101, which may occur at the direction of a communication service provider rather than the user.

An input can be received on the mobile device 101 when the mobile device 101 is in a sleep mode in step 306. The input may result in the mobile device 101 transitioning from the sleep mode to an awake mode. A swipe screen can be presented on the mobile device 101 upon transitioning to the awake mode based on the input in step 308. In the awake mode, an ad selected from one or more ads available to the swipe screen application 110 can be displayed on the swipe screen in step 310. For example, the swipe screen application 110 can be configured to present the ad on the swipe screen display of the mobile device 101.

Feedback can be provided on the incentive on the mobile device 101 in step 312. In an embodiment, the feedback may be provided to further retain the activation of the swipe screen application 110 on the mobile device 101 and/or to encourage the user to interact with the swipe screen ads. The feedback provided on the incentive can be provided on the swipe screen display or any other display after the mobile device 101 has been transitioned to the awake mode. In an embodiment, the feedback can comprise a display of a cumulative amount of money donated to charity on the mobile device 101.

Figure 6:
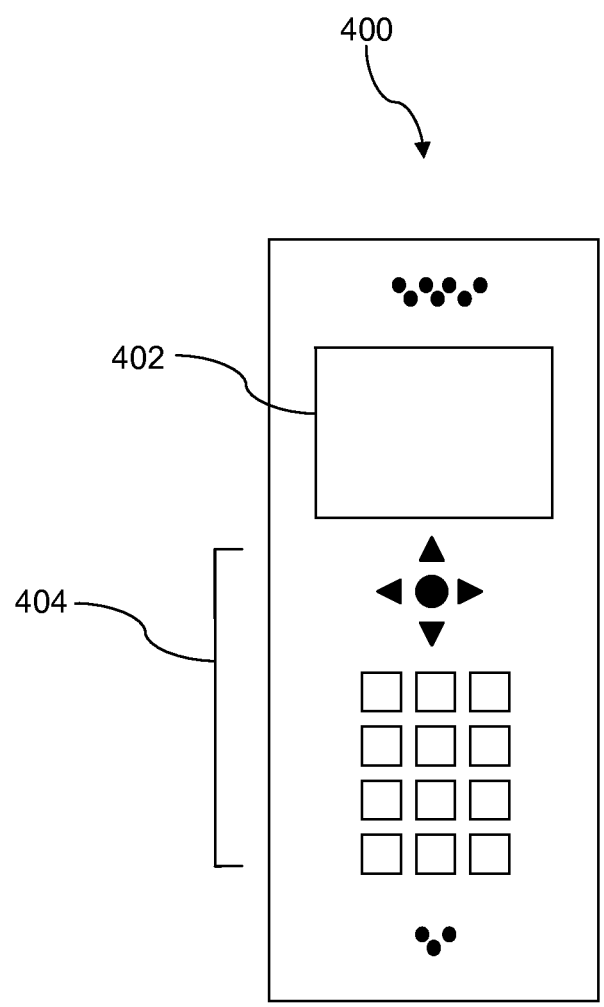
FIG. 6 is an illustration of a mobile communication device according to an embodiment of the disclosure.

FIG. 6 depicts the mobile device 400, which is operable for implementing aspects of the present disclosure, but the present disclosure should not be limited to these implementations. The mobile device 400 may be used as the mobile device described with respect to FIG. 1 above. Though illustrated as a mobile phone, the mobile device 400 may take various forms including a wireless handset, a pager, a personal digital assistant (PDA), a gaming device, or a media player. The mobile device 400 includes a display 402 and a touch-sensitive surface and/or keys 404 for input by a user. The mobile device 400 may present options for the user to select, controls for the user to actuate, and/or cursors or other indicators for the user to direct. The mobile device 400 may further accept data entry from the user, including numbers to dial or various parameter values for configuring the operation of the handset. The mobile device 400 may further execute one or more software or firmware applications in response to user commands. These applications may configure the mobile device 400 to perform various customized functions in response to user interaction. Additionally, the mobile device 400 may be programmed and/or configured over-the-air, for example from a wireless base station, a wireless access point, or a peer mobile device 400. The mobile device 400 may execute a web browser application which enables the display 402 to show a web page. The web page may be obtained via wireless communications with a base transceiver station, a wireless network access node, a peer mobile device 400 or any other wireless communication network or system.

Figure 7:
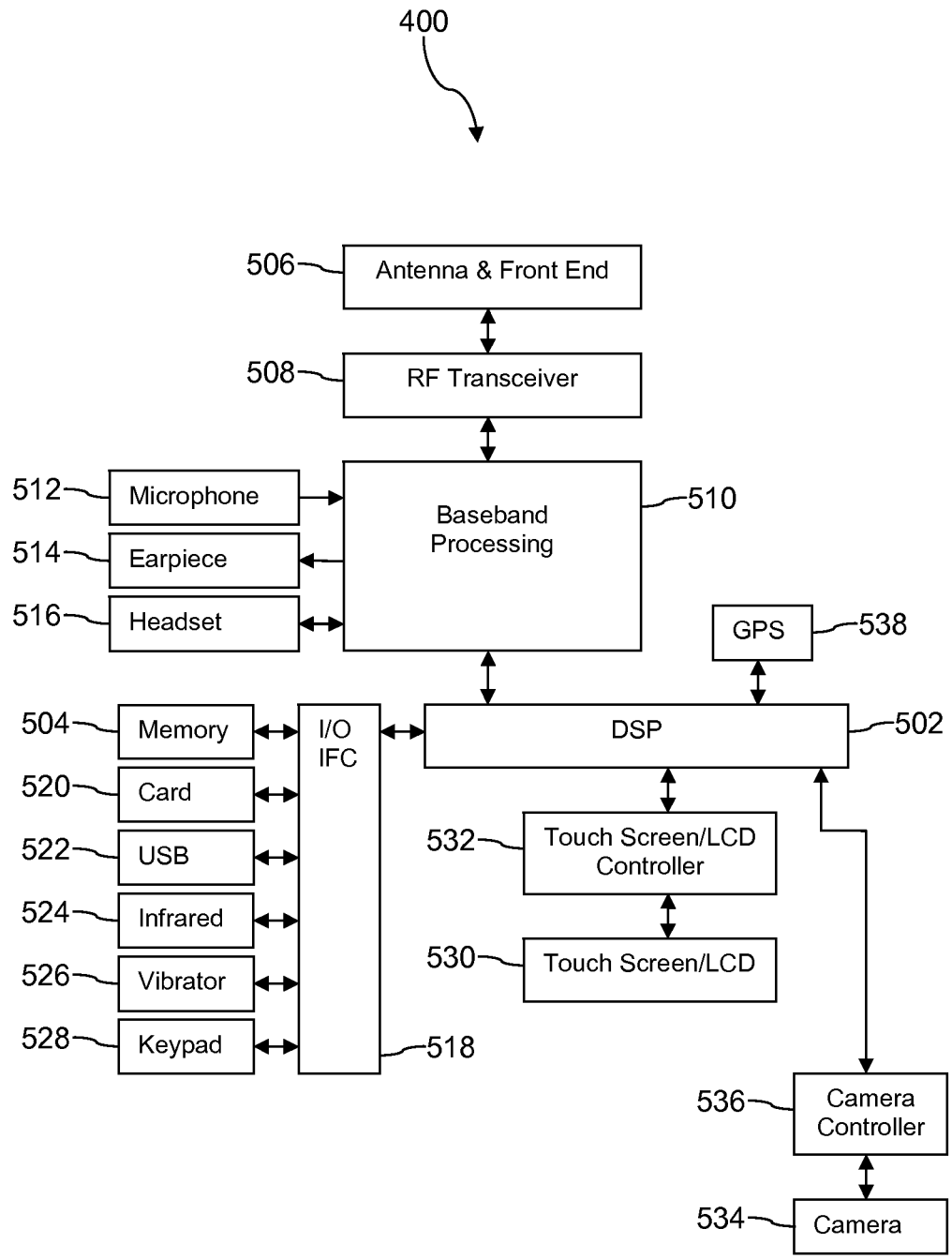
FIG. 7 is a block diagram of a mobile communication device according to an embodiment of the disclosure.

FIG. 7 shows a block diagram of the mobile device 400. While a variety of known components of handsets are depicted, in an embodiment a subset of the listed components and/or additional components not listed may be included in the mobile device 400. The mobile device 400 includes a digital signal processor (DSP) 502 and a memory 504. As shown, the mobile device 400 may further include an antenna and front end unit 506, a radio frequency (RF) transceiver 508, a baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a camera 534, a camera controller 536, and a global positioning system (GPS) receiver 538. In an embodiment, the mobile device 400 may include another kind of display that does not provide a touch sensitive screen. In an embodiment, the DSP 502 may communicate directly with the memory 504 without passing through the input/output interface 518. Additionally, in an embodiment, the mobile device 400 may comprise other peripheral devices that provide other functionality.

The DSP 502 or some other form of controller or central processing unit operates to control the various components of the mobile device 400 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 400 to function as a peripheral device to exchange information with a personal computer or other computer system. The infrared port 524 and other optional ports such as a Bluetooth interface or an IEEE 802.11 compliant wireless interface may enable the mobile device 400 to communicate wirelessly with other nearby handsets and/or wireless base stations.

The keypad 528 couples to the DSP 502 via the input/output interface 518 to provide one mechanism for the user to make selections, enter information, and otherwise provide input to the mobile device 400. Another input mechanism may be the touch screen LCD 530, which may also display text and/or graphics to the user. The touch screen LCD controller 532 couples the DSP 502 to the touch screen LCD 530. The GPS receiver 538 is coupled to the DSP 502 to decode global positioning system signals, thereby enabling the mobile device 400 to determine its position.

Figure 8A:
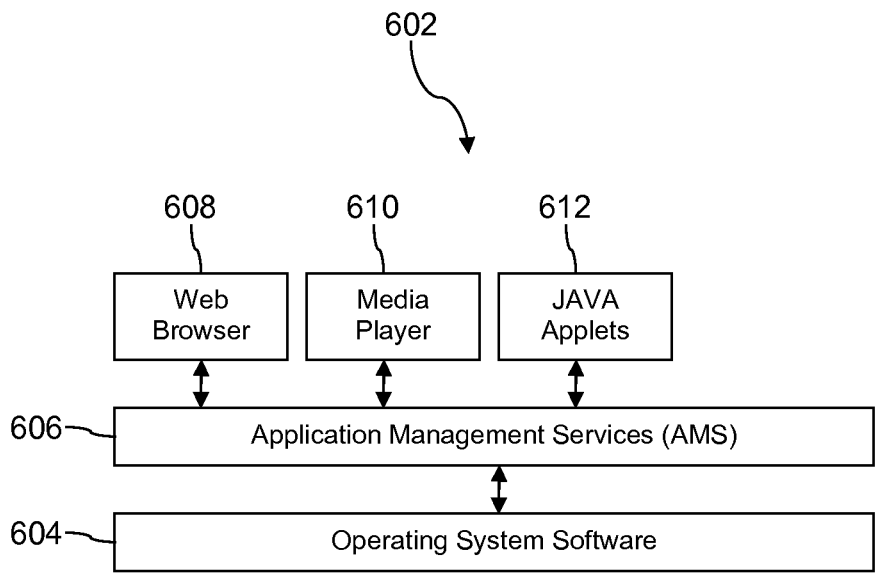
FIGS. 8A and 8B are block diagrams of software architecture for a mobile communication device according to an embodiment of the disclosure.

FIG. 8A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services (AMS) 606 that transfer control between applications running on the mobile device 400. Also shown in FIG. 8A are a web browser application 608, a media player application 610, and JAVA applets 612. The web browser application 608 may be executed by the mobile device 400 to browse content and/or the Internet, for example when the mobile device 400 is coupled to a network via a wireless link. The web browser application 608 may permit a user to enter information into forms and select links to retrieve and view web pages. The media player application 610 may be executed by the mobile device 400 to play audio or audiovisual media. The JAVA applets 612 may be executed by the mobile device 400 to provide a variety of functionality including games, utilities, and other functionality.

Figure 8B:
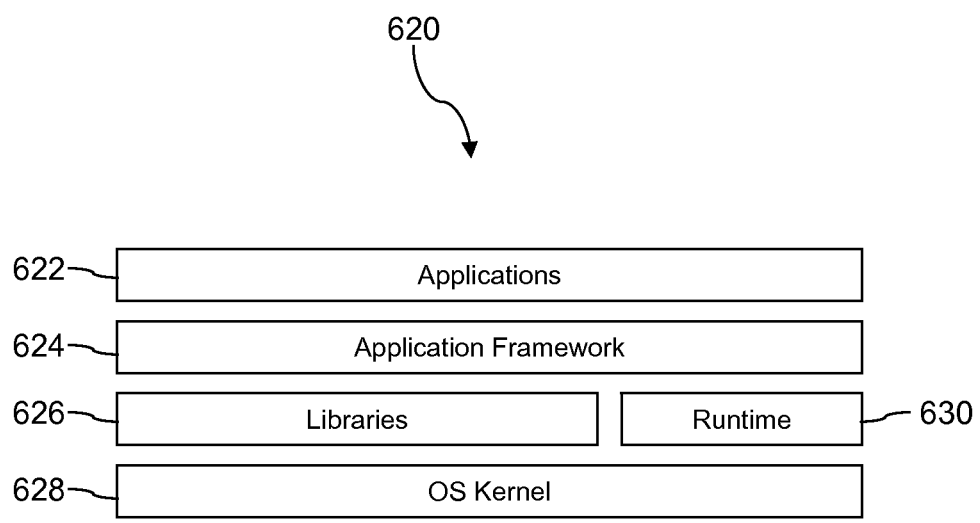

FIG. 8B illustrates an alternative software environment 620 that may be implemented by the DSP 502. The DSP 502 executes operating system kernel (OS kernel) 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 9:
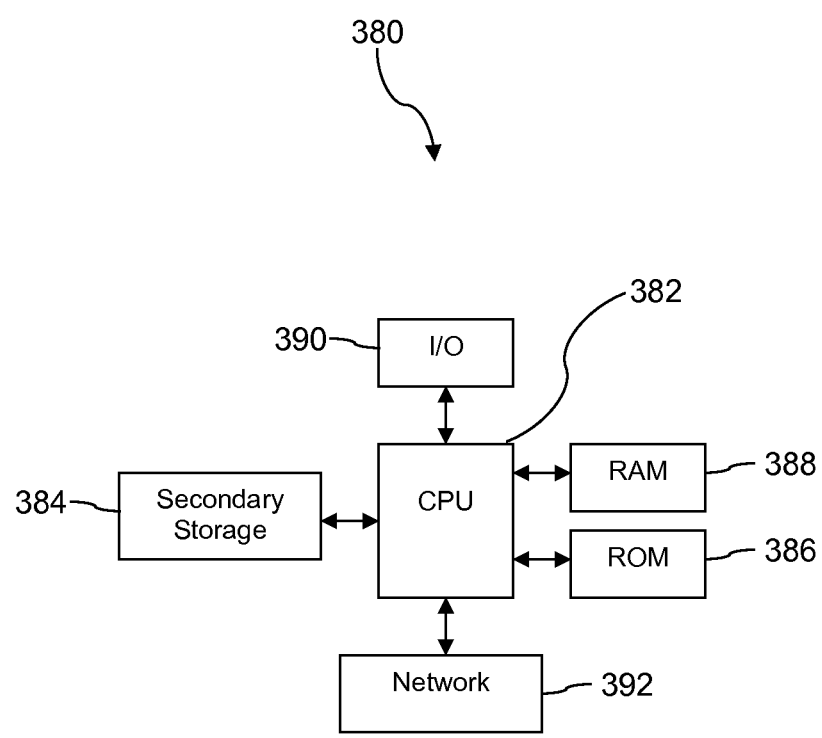
FIG. 9 illustrates an exemplary computer system suitable for implementing the several embodiments of the disclosure.

FIG. 9 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer system 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of displaying an ad on a swipe screen of a mobile device, the method comprising:
    selecting, by an ad manager executing on the mobile device, an ad from a plurality of ads stored in an ad cache in a non-transitory memory of the mobile device;
    pre-loading, by the ad manager, the selected ad from the ad cache for display on a swipe screen while the mobile device is in a sleep mode;
    receiving, by the mobile device, an input on the mobile device when the mobile device is in the sleep mode;
    presenting the swipe screen on the mobile device based on the input;
    displaying, by a swipe screen application executing on the mobile device, the pre-loaded ad on the swipe screen on the mobile device;
    receiving, via input devices on the mobile device, inputs on the swipe screen while displaying the pre-loaded ad on the swipe screen, wherein the inputs correspond to interactions with the pre-loaded ad, and wherein the input devices comprise an accelerometer and a touch screen of the mobile device;
    in response to receiving the inputs from the accelerometer and the touch screen, determining, by executing the swipe screen application on the mobile device, that the inputs from the accelerometer and the touch screen fall within an expected range of inputs for the pre-loaded ad;
    in response to determining that the inputs fall within the expected range of inputs for the pre-loaded ad, recording, by the swipe screen application executing on the mobile device, the inputs from the accelerometer and the touch screen as interactions with the pre-loaded ad on the swipe screen rather than link to another source of content;
    in response to recording the one or more inputs as interactions with the pre-loaded ad, generating, by the mobile device, an ad interaction report associated with the pre-loaded ad based on the interactions recorded using the one or more inputs while displaying the pre-loaded ad on the swipe screen; and
    sending, by the ad manager from the mobile device, the ad interaction report to a server associated with the pre-loaded ad.

2. The method of claim 1, wherein selecting the ad from the plurality of ads comprises: applying information from a user profile to the plurality of ads stored in the ad cache.

3. The method of claim 1, further comprising: updating the plurality of ads in the ad cache, wherein updating the plurality of ads is based on at least one of: a network connection type, a network connection bandwidth, an available memory of the mobile device, or a priority of one or more of the plurality of ads, wherein receiving the plurality of ads is based on connection bandwidth available to the mobile device, and wherein the ad manager selects to receive one or more of the plurality of ads at a rate less than a full data rate of the connection bandwidth.

4. The method of claim 1, wherein selecting the ad from the plurality of ads stored in the ad cache comprises:
    retrieving a user profile for a user of the mobile device, wherein the user profile comprises user demographic information;
    retrieving one or more policies, wherein the one or more policies comprise demographic rules for the plurality of ads;
    applying the one or more policies to the user profile for the plurality of ads; and
    determining that the ad complies with the one or more demographic rules based on the user demographic information.

5. The method of claim 1, wherein selecting the ad from the plurality of ads comprises: applying one or more policies to the plurality of ads stored in the ad cache.

6. The method of claim 5, wherein the one or more policies comprise a frequency threshold for displaying the ad on the swipe screen, and wherein displaying the ad comprises displaying the ad at a rate equal to or less than the frequency.

7. The method of claim 5, wherein the one or more policies comprise one or more time periods for displaying the ad on the swipe screen, and wherein displaying the ad comprises displaying the ad within the one or more time periods.

8. The method of claim 5, wherein the one or more policies comprise a context for displaying the ad on the swipe screen, and wherein displaying the ad comprises displaying the ad during an activity meeting the context.

9. The method of claim 1, further comprising: receiving a display message comprising instructions to display the ad selected from the plurality of ads during a first time period, wherein displaying the ad comprises displaying the ad on the swipe screen during the first time period, and wherein a related ad is displayed on an external medium during the first time period.

10. A method of displaying an ad on a swipe screen of a mobile device, the method comprising:
    pre-loading, by an ad manager on the mobile device while the mobile device is in a sleep mode, an ad selected by the ad manager from a plurality of ads stored in an ad cache in a non-transitory memory of the mobile device for display on a swipe screen;
    receiving an input on the mobile device when the mobile device is in the sleep mode;
    in response to receiving the input, presenting the swipe screen on the mobile device;
    displaying, by a swipe screen application executing on the mobile device, the pre-loaded ad on the swipe screen on the mobile device;
    receiving, by input devices on the mobile device, inputs on the swipe screen while displaying the pre-loaded ad on the swipe screen, wherein the input devices comprise an accelerometer and a touch screen of the mobile device;

in response to receiving the inputs from the accelerometer and the touch screen, determining, by executing the swipe screen application on the mobile device, that the inputs fall within an expected range of inputs for the pre-loaded ad via the accelerometer and the touch screen;

in response to determining that the inputs fall within the expected range of inputs for the pre-loaded ad, recording, by executing the swipe screen application on the mobile device, the inputs with the accelerometer and the touch screen as interactions corresponding to the pre-loaded ad displayed on the swipe screen rather than link to another source of content;

tracking, by the ad manager, an amount of interactions within the swipe screen corresponding with the pre-loaded ad on the swipe screen based on the recorded interactions;

generating, by the ad manager, an interaction message comprising the amount of interactions based on the tracking; and sending, by the ad manager, the interaction message to a server associated with the pre-loaded ad.

11. The method of claim 10, further comprising:

receiving, by the ad manager executing on the device, a plurality of ads based on connection bandwidth available to the mobile device, wherein the ad manager selects to receive one or more of the plurality of ads at a rate less than a full data rate of the connection bandwidth;

receiving a gesture on the swipe screen that does not correspond with the ad displayed on the swipe screen; and proceeding to at least one of a lock screen or a home screen displayed on the mobile device in response to the received gesture that does not correspond with the ad due to being outside of the expected range inputs.

12. The method of claim 10, further comprising:

transitioning, by the mobile device, from an awake mode to the sleep mode;

initiating, by the swipe screen application, the ad in response to transitioning to the sleep mode, wherein the ad starts to execute on a processor of the mobile device upon the initiating;

pausing, by the swipe screen application, the ad when the ad has loaded and begun to execute, wherein the swipe screen application is configured to retain the paused ad in memory until the input is received when the mobile device is in the sleep mode; and resuming, by the swipe screen application, the paused ad in response to presenting the swipe screen on the mobile device.

13. The method of claim 10, wherein displaying the ad comprises displaying the ad across substantially all of the display of the mobile device.

14. The method of claim 10, wherein the ad comprises an interactive ad.

15. The method of claim 10, wherein generating the interaction message occurs in near real time.

16. A method of providing feedback on a swipe screen display, the method comprising:

providing, to a mobile device via a network, an incentive to activate a swipe screen application, wherein the swipe screen application is configured to display one or more ads on a swipe screen of a mobile device;

activating the swipe screen application on the mobile device based at least in part on the incentive received by the mobile device;

pre-loading, by an ad manager on the mobile device while the mobile device is in a sleep mode, an ad selected by the ad manager from a plurality of ads in an ad cache stored in a non-transitory memory of the mobile device for display on the swipe screen;

receiving an input on the mobile device when the mobile device is in the sleep mode;

generating, by the swipe screen application executing on the mobile device, the swipe screen comprising the pre-loaded ad for display on the mobile device;

displaying, by the swipe screen application, the swipe screen comprising the pre-loaded ad selected from the plurality of ads in the ad cache on the mobile device;

receiving, by input devices on the mobile device, inputs on the swipe screen while displaying the pre-loaded ad on the swipe screen, wherein the input devices comprise an accelerometer and a touch screen of the mobile device;

in response to receiving the inputs from the accelerometer and the touch screen, determining, by executing the swipe screen application on the mobile device, that the inputs fall within an expected range of inputs for the pre-loaded ad via the accelerometer and the touch screen;

in response to determining that the one or more inputs fall within the expected range of inputs for the pre-loaded ad, recording, by executing the swipe screen application on the mobile device, the inputs from the accelerometer and the touch screen as interactions corresponding to the pre-loaded ad displayed on the swipe screen rather than link to another source of content;

tracking, by the ad manager, an amount of interactions within the swipe screen corresponding with the pre-loaded ad displayed on the swipe screen based on the recorded interactions;

generating, by the ad manager, an interaction message comprising the amount of interactions based on the tracking; and providing, from the mobile device to a communicatively coupled server, feedback on the incentive on the mobile device by sending the interaction message to the communicatively coupled server.

17. The method of claim 16, further comprising:

downloading, by the mobile device, the swipe screen application based at least in part on the incentive; and receiving, by the ad manager within the swipe screen application executing on the device, a plurality of ads based on connection bandwidth available to the mobile device, wherein the ad manager selects to receive one or more of the plurality of ads at a rate less than a full data rate of the connection bandwidth.

18. The method of claim 16, further comprising downloading an operating system update, wherein the operating system update comprises the swipe screen application.

19. The method of claim 16, further comprising receiving, by the ad manager, the ad in the ad cache based on a determination of at least one of a location of the mobile device and an activity in which the mobile device is engaged, and wherein the activity in which the mobile device is engaged corresponds to at least one of walking, running, biking, swimming, hiking, boating, or riding in a vehicle.

20. The method of claim 1, wherein at least one interaction with the pre-loaded ad within the swipe screen is needed to proceed past the swipe screen.

\* \* \* \* \*